(12) United States Patent
Gabbai et al.

(10) Patent No.: US 12,525,764 B2
(45) Date of Patent: Jan. 13, 2026

(54) DEVICES FOR GENERATION OF ELECTROMAGNETIC RADIATION OF PREDETERMINED PROFILE

(71) Applicant: TERAHERTZ GROUP LTD., Herzliya (IL)

(72) Inventors: Eran Gabbai, Ma'as (IL); Regina Aharonov-Nadborny, Beit-Arie (IL)

(73) Assignee: TERAHERTZ GROUP LTD., Herzliya (IL)

( * ) Notice: Subject to any disclaimer, the term of this patent is extended or adjusted under 35 U.S.C. 154(b) by 796 days.

(21) Appl. No.: 17/598,076

(22) PCT Filed: Mar. 25, 2020

(86) PCT No.: PCT/IB2020/052833
§ 371 (c)(1),
(2) Date: Sep. 24, 2021

(87) PCT Pub. No.: WO2020/194215
PCT Pub. Date: Oct. 1, 2020

(65) Prior Publication Data
US 2022/0181840 A1   Jun. 9, 2022

Related U.S. Application Data

(60) Provisional application No. 62/823,799, filed on Mar. 26, 2019.

(51) Int. Cl.
*H01S 5/00* (2006.01)
*G02F 1/35* (2006.01)
*H01S 5/40* (2006.01)

(52) U.S. Cl.
CPC .......... *H01S 5/0092* (2013.01); *G02F 1/3534* (2013.01); *H01S 5/4087* (2013.01)

(58) Field of Classification Search
CPC ..... G02F 1/3534; H01S 5/0092; H01S 5/4087
See application file for complete search history.

(56) References Cited

U.S. PATENT DOCUMENTS 7,152,007 B2 * 12/2006 Arnone .............. G01N 21/3563
702/75
7,174,037 B2 * 2/2007 Arnone .............. G01N 21/4795
250/341.1
(Continued)

FOREIGN PATENT DOCUMENTS

WO    WO-2019/021282 A1    1/2019

OTHER PUBLICATIONS

International Search Report & Written Opinion of the International Searching Authority issued in PCT/IB2020/052833, mailed Jul. 8, 2020.

*Primary Examiner* — Rhonda S Peace
(74) *Attorney, Agent, or Firm* — Tarolli, Sundheim, Covell & Tummino LLP

(57) ABSTRACT

A device for producing an electromagnetic radiation of predetermined properties is configured as a layered structure and includes a light interacting layer, in communication with at least one light emitting source, and having one or more light interacting regions, each configured to define a closed-loop light mixing path for optically coupling a pair of input coherent light components of predetermined first and second frequencies to create an output radiation component of a third beating frequency of a predetermined high-frequency profile. The device further includes a control layer interfacing with said light interacting layer and configured for controllable switching between inoperative opaque and operative transparent states with respect to the at least one third beating frequency, to selectively prevent and allow transmission of the at least one output radiation component (Continued)

of the third frequency towards a medium in the vicinity of the layered structure.

14 Claims, 12 Drawing Sheets

(56) References Cited

U.S. PATENT DOCUMENTS

| | | | |
|---|---|---|---|
| 7,291,839 B1 | 11/2007 | Demers et al. | |
| 7,326,930 B2* | 2/2008 | Crawely | G01J 3/4338 |
| | | | 250/341.1 |
| 10,809,529 B2* | 10/2020 | Robbins | G02F 1/134309 |
| 2003/0138182 A1* | 7/2003 | Dultz | G02F 1/0136 |
| | | | 385/11 |
| 2003/0178584 A1 | 9/2003 | Arnone et al. | |
| 2005/0180676 A1* | 8/2005 | Ellwood | G02F 1/093 |
| | | | 385/11 |
| 2006/0120654 A1* | 6/2006 | Aoki | G02F 1/2255 |
| | | | 385/40 |
| 2010/0195675 A1 | 8/2010 | Moloney et al. | |
| 2011/0311234 A1 | 12/2011 | Almassy et al. | |
| 2019/0285796 A1* | 9/2019 | Waldern | G02B 6/2726 |
| 2020/0183204 A1* | 6/2020 | Yoshida | C09K 19/544 |
| 2022/0181840 A1* | 6/2022 | Gabbai | G02F 1/3534 |

\* cited by examiner

DEVICES FOR GENERATION OF ELECTROMAGNETIC RADIATION OF PREDETERMINED PROFILE

CROSS-REFERENCE TO RELATED APPLICATIONS

The present application is a National Stage Application of International Patent Application No. PCT/IB2020/052833, filed Mar. 25, 2020, which claims the benefit of priority to U.S. Provisional Pat. App. No. 62/823,799, filed Mar. 26, 2019, the entire contents of which are incorporated herein by reference in their entireties.

TECHNOLOGICAL FIELD

This present disclosure is in the field of optoelectronics and relates specifically to optoelectronic sensing devices.

SUMMARY

The present disclosure encompasses approaches for various sensing applications, such as a sample detection and property determination. The disclosure permits using advanced detection technologies for personal use, e.g., for integrating such technologies in personal electronic devices such as smartphones, tablets and computers.

The present disclosure provides exemplary nano-electromechanical optoelectronic techniques to be utilized in a sensing function and/or mechanism integrated in handheld devices and internet of things (TOT) applications. The technique of the present disclosure provides integration in a personal device of such advanced functionalities and/or features as terahertz technologies that can be used, for example, for determining properties of and/or detecting materials. A personal device incorporating the techniques and/or features of the present disclosure, when being simply exposed to media in a region of interest, is capable of identifying/determining/measuring properties of one or more materials in said media, which in particular is in fluid or gas phase. Analysis of the sampling and measurement results may then be done internally, by a local data processor of the personal device and/or via communication with a remote data processor, e.g., using cloud computing techniques. The data analysis may include, for example, comparing the detected signal to a pre-determined signature relating to the specific material/property.

Certain embodiments may utilize features, including hardware and/or software of a known personal communication device, further modified to incorporate the structural and functional features unique to the particular embodiments. More specifically, sampling of a material of interest with terahertz radiation is facilitated by utilizing simple coherent light source(s) in the visible or infra-red range (e.g., lasers), and transforming the light, in a controllable manner (e.g., with a certain control pattern), into electromagnetic radiation in the terahertz range by interference or self-interference effects to create a terahertz beating frequency, while the relevant structures are kept within a miniature size range suitable for integration within a personal device.

To this end, the radiation source of the certain embodiments may be implemented as an integrated (layered) structure, which may be a separate structure located in an optical path of light emitted by coherent light sources or may include the light source structure as a part thereof. In particular, implementations in which the light source structure is integrated may be include devices such as a miniature personal device, e.g., a smart phone, while appreciating that the coherent light source may be implemented as a layered structure, e.g., vertical-cavity surface-emitting lasers (VCSELs).

Thus, generally, the present disclosure provides a radiation source device for producing an electromagnetic radiation of predetermined properties, namely radiation of a predetermined high-frequency (spectral) profile and predetermined radiating profile/pattern (e.g. pulse profile). Moreover, the radiation source device of the invention may be further configured to use the so-produced THz radiation to create an electron gun, i.e. produce controllable electron flux.

According to one broad aspect of the present invention, such device is configured as a layered structure comprising:
a light interacting layer comprising one or more light interacting regions, each configured to define a closed-loop light mixing path for optically coupling a pair of input coherent light components of predetermined first and second frequencies to create an output radiation component of a third beating frequency of a predetermined high-frequency profile;
a control layer interfacing said light interacting layer, said control layer being configured for controllable switching between an inoperative opaque state and an operative transparent state with respect to the at least one third beating frequency, to therefore selectively prevent and allow transmission of the at least one output radiation component of the third frequency towards a medium in the vicinity of the layered structure. For example, such a device allows transmission of the radiation component towards a medium that is adjacent to the layered structure, at least 0.1 to 25 cm away from the device.

In some embodiments, the layered structure further comprises a lighting layer interfacing said light interacting layer, the lighting layer comprising one or more coherent light emitters configured to produce one or more pairs of the input coherent light components of predetermined first and second frequencies. As noted above, the coherent light emitter may be configured as VCSEL.

In some embodiments, the radiation source device further comprises an electron emission structure, which may also be a layered structure and may be a part of the above-described layered structure. The electron emission structure is configured as a photoemission diode or triode structure, e.g., a structure including a photocathode and anode/gate electrode(s) with a cavity between the photocathode and anode/gate. The photocathode is exposed to (interfaces with) said control layer to be exposed to the third frequency electromagnetic radiation component(s), when the control layer is in its operative transparent state, to emit an electron beam/flux into the cavity. When electric potential is applied between the electrodes, the anode and/or gate electrode attracts the emitted electrons and allows their flow through the cavity, where the medium (sampling cell) is located.

Thus, according to another exemplary aspect of the invention, there is provided a radiation source device for producing an electromagnetic radiation of predetermined properties, the device being configured as a layered structure and comprising:
a lighting layer comprising one or more pairs of light sources, each pair being configured and operable to produce first and second light pulses of respective first and second frequencies;
a light interacting layer comprising, for each pair of light sources, a light interacting region, in which the first and second light pulses interact to thereby produce a third electromagnetic radiation of a third frequency of high-frequency profile; and a control layer being configured and operable as a switch to be selectively opaque thereby permitting said interaction of the first and second light pulses and production of the third electromagnetic radiation, and further configured to be selectively transparent thereby permitting said third electromagnetic radiation to pass through as an output electromagnetic radiation.

According to another exemplary aspect of the invention, there is provided a sensing device (a sensor or sensor system) for determining one or more properties of a sample, the sensing device comprising the device for producing an electromagnetic radiation of predetermined properties as described above, and a sampler (a sampling module) coupled to an output of the above-described device to thereby receive said output electromagnetic radiation, the sampler comprising a transmitter, a receiver and a sampling cell located therebetween, the transmitter being configured as a photocathode configured and operable to receive the output electromagnetic radiation and generate corresponding photo electrons that travel through the sampling cell towards the receiver being configured as an anode, an interaction between the photo electrons and the sample in the sampling cell being indicative of the one or more properties of the sample.

Thus, such embodiments provide a device for producing electromagnetic radiation of predetermined properties, the device being configured as a layered structure and comprising:

a light interacting layer, in communication with at least one light emitting source, comprising one or more light interacting regions, each configured to define a closed-loop light mixing path for optically coupling a pair of input coherent light components of predetermined first and second frequencies to create an output radiation component of a third beating frequency of a predetermined high-frequency profile; and a control layer interfacing said light interacting layer, said control layer being configured for controllable switching between an inoperative opaque state and an operative transparent state with respect to the at least one third beating frequency, to therefore selectively prevent and allow transmission of the at least one output radiation component of the third frequency towards a medium in the vicinity of the layered structure.

At least one embodiment further provides the device as defined above, wherein said third beating frequency is in the THz range.

At least one embodiment further provides the device as defined above, wherein said light interacting layer has an elliptical shape.

At least one embodiment further provides the device as defined above, wherein said elliptical shape varies the Fabry-Perot resonance thereof to thereby blue-shift said third beating frequency.

At least one embodiment further provides the device as defined above, wherein said control layer is controllable transparency with respect to at least one selected from a group consisting of a third beating frequency and input coherent light components of predetermined first and second frequencies.

At least one embodiment further provides the device as defined above, wherein said control layer, in said transparent state, is transparent to said third beating frequency to thereby permit the electromagnetic radiation to pass therethrough.

At least one embodiment further provides the device as defined above, wherein said control layer, in said opaque state, is opaque to said input coherent light components of said predetermined first and second frequencies to thereby permit the interaction thereof within said light interacting layer.

At least one embodiment further provides the device as defined above, wherein said light emitting source is adapted to provide coherent light.

At least one embodiment further provides the device as defined above, further comprising a lighting layer interfacing the light interacting layer and comprising one or more coherent light emitters configured to produce one or more pairs of the input coherent light components of predetermined first and second frequencies.

At least one embodiment further provides the device as defined above, further comprising a focusing layer interfacing with the control layer and comprising a focusing device for controlling focusing properties of the electromagnetic radiation of the third frequency.

At least one embodiment further provides the device as defined above, wherein said focusing layer comprising at least one selected from a group consisting of a focusing lens, a mirror, any other electromagnetic radiation focusing device and any combination thereof.

At least one embodiment further provides the device as defined above, wherein said at least one light emitting source is either integrated within said device or externally to said device.

At least one embodiment further provides the device as defined above, wherein said at least one light source is a laser in the visible or infrared range.

At least one embodiment further provides the device as defined above, wherein said light emitters sources are vertical-cavity surface-emitting lasers (VCSELs).

At least one embodiment further provides the device as defined above, wherein said VCSEL has high contrast grating (HCG) integrated therewith as a top mirror of the VCSEL.

At least one embodiment further provides the device as defined above, wherein said light interacting layer is a ring resonator.

At least one embodiment further provides the device as defined above, wherein said light interacting region has an elliptical shape.

At least one embodiment further provides the device as defined above, wherein said control layer comprises vanadium dioxide ($VO_2$) nanoparticles configured and operable to controllably switch between opaque and transparent phases upon being subjected to electrons directed to the control layer (e.g., injected to the control layer).

At least one embodiment further provides the device as defined above, wherein said control layer comprises a mesh of gold nanoparticles configured as a plasmonic photocathode such that when illuminated by a spectrally resonant femtosecond laser pulse said electrons are created.

At least one embodiment further provides the device as defined above, wherein said electromagnetic radiation has the third frequency in a terahertz range.

At least one embodiment further provides the device as defined above, additionally comprising a phase modulator.

At least one embodiment further provides the device as defined above, wherein said phase modulator is interconnected with said light interacting layer, adapted to phase modulate said input coherent light components of predetermined first and second frequencies to cause interaction/interference therebetween and to create said output radiation component of a third beating frequency of said predetermined high-frequency profile.

At least one embodiment further provides the device as defined above, wherein said phase modulator is a MEMS device.

At least one embodiment further provides the device as defined above, wherein said light interacting layer is at least one selected from a group consisting of a fused nano fiber coupler, a coupler on chip silicon on insulator (SOI) assembly, an integrated phase modulator chip, a separated packaged-phase modulator chip and any combination thereof.

At least one embodiment further provides a method for producing electromagnetic radiation of predetermined properties, comprising:
  providing at least one pair of input coherent light components of predetermined first and second frequencies, by means of at least one light emitting source;
  providing at least one light interacting layer, in communication with said at least one light emitting source, comprising one or more light interacting regions, each configured to define a closed-loop light mixing path for optically coupling said pair of input coherent light components of said predetermined first and second frequencies; thereby creating an output radiation component of a third beating frequency of a predetermined high-frequency profile; and
  providing a control layer interfacing said at least one light interacting layer, said control layer being configured for controllable switching between an inoperative opaque state and an operative transparent state with respect to the at least one third beating frequency, to therefore selectively prevent and allow transmission of the at least one output radiation component of the third frequency towards a medium in the vicinity of the layered structure.

At least one embodiment further provides the method as defined above, wherein said third beating frequency is in the THz range.

At least one embodiment further provides the method as defined above, wherein said light interacting layer has an elliptical shape.

At least one embodiment further provides the method as defined above, wherein said elliptical shape varies the Fabry-Perot resonance thereof to thereby blue-shift said third beating frequency.

At least one embodiment further provides the method as defined above, wherein said control layer is controllable transparency with respect to at least one selected from a group consisting of third beating frequency and input coherent light components of predetermined first and second frequencies.

At least one embodiment further provides the method as defined above, wherein said control layer, in said transparent state, is transparent to said third beating frequency to thereby permit the electromagnetic radiation to pass therethrough.

At least one embodiment further provides the method as defined above, wherein said control layer, in said opaque state, is opaque to said input coherent light components of said predetermined first and second frequencies to thereby permit the interaction thereof within said light interacting layer.

At least one embodiment further provides the method as defined above, wherein said light emitting source is adapted to provide coherent light.

At least one embodiment further provides the method as defined above, further comprising a lighting layer interfacing the light interacting layer and comprising one or more coherent light emitters configured to produce one or more pairs of the input coherent light components of predetermined first and second frequencies.

At least one embodiment further provides the method as defined above, further comprising a focusing layer interfacing with the control layer and comprising a focusing device for controlling focusing properties of the electromagnetic radiation of the third frequency.

At least one embodiment further provides the method as defined above, wherein said focusing layer comprises at least one selected from a group consisting of a focusing lens, a mirror, any other electromagnetic radiation focusing device and any combination thereof.

At least one embodiment further provides the method as defined above, wherein said at least one light emitting source is either integrated within said device or externally to said device.

At least one embodiment further provides the method as defined above, wherein said at least one light source is a laser in the visible or infrared range.

At least one embodiment further provides the method as defined above, wherein said light emitters sources are vertical-cavity surface-emitting lasers (VCSELs).

At least one embodiment further provides the method as defined above, wherein said VCSEL has high contrast grating (HCG) integrated therewith as a top mirror of the VCSEL.

At least one embodiment further provides the method as defined above, wherein said light interacting layer is a ring resonator.

At least one embodiment further provides the method as defined above, wherein said light interacting region has an elliptical shape.

At least one embodiment further provides the method as defined above, wherein said control layer comprises vanadium dioxide ($VO_2$) nanoparticles configured and operable to controllably switch between opaque and transparent phases upon being subjected to electrons directed to the control layer (e.g., electrons injected to the control layer).

At least one embodiment further provides the method as defined above, wherein said control layer comprises a mesh of gold nanoparticles configured as a plasmonic photocathode such that when illuminated by a spectrally resonant femtosecond laser pulse said electrons are created.

At least one embodiment further provides the method as defined above, wherein said electromagnetic radiation has the third frequency in a terahertz range.

At least one embodiment further provides the method as defined above, additionally comprising a phase modulator.

At least one embodiment further provides the method as defined above, wherein said phase modulator is interconnected with said light interacting layer, and adapted to phase modulate said input coherent light components of predetermined first and second frequencies to cause interaction/interference therebetween and to create said output radiation component of a third beating frequency of said predetermined high-frequency profile.

At least one embodiment further provides the method as defined above, wherein said phase modulator is a MEMS device.

At least one embodiment further provides the method as defined above, wherein said light interacting layer is at least one selected from a group consisting of a fused nano fiber coupler, a coupler on chip silicon on insulator (SOI) assembly, an integrated phase modulator chip, a separated packaged-phase modulator chip and any combination thereof.

At least one embodiment further provides a sensing device for determining one or more properties of at least one sample, the sensing device comprising:
(a) at least one device of any of the defined above;
(b) at least one sampler coupled to an output of the device of any of the defined above to thereby receive said output electromagnetic radiation;
said sampler comprising at least one transmitter, at least one receiver and at least one sampling cell located therebetween.

At least one embodiment further provides the sensing device as defined above, wherein said at least one transmitter being configured as a photocathode configured and operable to receive the output electromagnetic radiation and generate corresponding photo electrons that travel through said at least sampling cell towards said at least one receiver being configured as an anode, wherein interaction between the photo electrons and the sample being indicative of said one or more properties of said sample.

At least one embodiment further provides the sensing device as defined above, wherein volatile compounds are captured in said sampler.

At least one embodiment further provides the sensing device as defined above, additionally comprising at least one pressure source adapted to apply suction to said sample and to thereby capture volatile compounds in said sampler. For example, the pressure source may be configured as a suction module in the form of a pump selectively operable to apply negative pressure to create a vacuum.

At least one embodiment further provides the sensing device as defined above, additionally comprising at least one membrane structured to ensure suction of said volatile compounds in said sampler and to seal said volatile compounds in said sampler.

At least one embodiment further provides the sensing device as defined above, additionally comprising means adapted to release said volatile compounds from said sampling module after determination of said one or more properties of said sample (e.g., by means of said sensing device).

At least one embodiment further provides the sensing device as defined above, additionally comprising means adapted to clean said volatile compounds from said sampling module after determination of said one or more properties of said sample (e.g., by means of said sensing device).

At least one embodiment further provides the sensing device as defined above, additionally comprising (a) at least one controller programmed to receive data indicative of said collected volatile compounds interacting with said third beating frequency of said predetermined high-frequency profile; and (b) processing said data to identify a signature of at least one compound indicative of said volatile compounds of said at least one sample.

At least one embodiment further provides the sensing device as defined above, wherein said sample is in gas, liquid, solid or fluid phase.

At least one embodiment further provides the sensing device as defined above, wherein said one or more properties of the sample comprise an identification of one or more constituents of the sample.

At least one embodiment further provides the sensing device as defined above, wherein said one or more properties of the sample are determined based on a pre-built library of signatures stored in a database.

At least one embodiment further provides the sensing device as defined above wherein the sensing device configured and operable for use in an IOT device, personal device, a smartphone, a tablet or a computer.

At least one embodiment further provides the sensing device as defined above, wherein said volatile compounds or said sample is one selected from a group consisting of Dimethyl Ether, Isoprene, Methyl Nitrate, Methyl Cyanide, Chloromethane, Acetaldehyde, Acetone, HCN, Water, Ethanol, Methanol, Ethyl Benzene, CO, Formaldehyde, Butyraldehyde Toluene, Butyric Acid, Propionic Acid, Dimethyl Sulfide and Pyruvic Acid, Zolpidem, Ambien, Benzodiazepines, Valium, Librium, Xanax, Ativan, Rohypnol, Whitleys, Trip-and-Fall, Ruffles, Rophies, Rope, Roopies, Roofies, Roches, Roach-2, Roach, Mind Erasers, Rib, Lunch Money, R-2, Poor Man's Quaalude, Mexican Valium, LA Rochas, Forget Pill, Circles, 3,4-Methylenedioxymethamphetamine (MDMA) and any combination thereof.

At least one embodiment further provides a sensing method for determining one or more properties of at least one sample, comprising:
(a) providing at least one device of any of the defined above,
(b) coupling at least one sampler comprising (i) at least one transmitter, (ii) at least one receiver and (iii) at least one sampling cell located therebetween to an output of said device of the defined above to thereby receive said output electromagnetic radiation.

At least one embodiment provides the sensing method as defined above, further comprising receiving the output electromagnetic radiation by the at least one transmitter, the at least one transmitter being configured as a photocathode and generating, by the at least one transmitter, corresponding photo electrons that travel through said at least one sampling cell towards said at least one receiver being configured as an anode, wherein interaction between the photo electrons and the sample is indicative of said one or more properties of said sample.

At least one embodiment further provides the sensing method as defined above, further comprising capturing volatile compounds in said sampler.

At least one embodiment further provides the sensing method as defined above, additionally comprising applying suction to said sample and to thereby capture volatile compounds in said sampler. For example, a suction module such as a pressure source (a source of negative pressure) may be provided, e.g., in the form of a pump applying negative pressure to establish a vacuum.

At least one embodiment further provides the sensing method as defined above, additionally comprising applying suction to said volatile compounds and sealing said volatile compounds in said sampler module by at least one membrane.

At least one embodiment further provides the sensing method as defined above, additionally comprising releasing said volatile compounds from said sampler after determination of said one or more properties of said sample (e.g., by means of said sensing device). For example, the compounds may be released via means for releasing (e.g., a discharge port or outlet).

At least one embodiment further provides the sensing method as defined above, additionally comprising cleaning said volatile compounds from said sampler after determination of said one or more properties of said sample (e.g., by means of said sensing device). For example, the cleaning may be accomplished by means for cleaning such as ultrasonic irradiation and/or using a pressure source such as a pump to establish negative pressure in the form of a vacuum. In some embodiments, the suction module or means for suctioning may be the same as or similar to the cleaning means, e.g., a pump configured to create a vacuum.

At least one embodiment further provides the sensing device as defined above, additionally comprising (a) receiving, by at least one controller, data indicative of said collected volatile compounds interacting with said third beating frequency of said predetermined high-frequency profile; and (b) processing said data for identifying at least one signature indicative of said volatile compounds of said at least one sample.

At least one embodiment further provides the sensing method as defined above, wherein said sample is in gas, liquid, solid or fluid phase.

At least one embodiment further provides the sensing method as defined above, wherein said one or more properties of the sample comprise an identification of one or more constituents of the sample (e.g., an identifier associated with at least one constituent).

At least one embodiment further provides the sensing method as defined above, wherein said one or more properties of the sample are determined based on a pre-built library of signatures stored in a database (e.g., a signature repository).

At least one embodiment further provides the sensing method as defined above, being configured and operable for use in any TOT device, personal device, a smartphone, a tablet or a computer.

At least one embodiment further provides the sensing device as defined above, wherein said volatile compounds or said sample is one selected from a group consisting of Dimethyl Ether, Isoprene, Methyl Nitrate, Methyl Cyanide, Chloromethane, Acetaldehyde, Acetone, HCN, Water, Ethanol, Methanol, Ethyl Benzene, CO, Formaldehyde, Butyraldehyde Toluene, Butyric Acid, Propionic Acid, Dimethyl Sulfide and Pyruvic Acid, Zolpidem, Ambien, Benzodiazepines, Valium, Librium, Xanax, Ativan, Rohypnol, Whitleys, Trip-and-Fall, Ruffles, Rophies, Rope, Roopies, Roofies, Roches, Roach-2, Roach, Mind Erasers, Rib, Lunch Money, R-2, Poor Man's Quaalude, Mexican Valium, LA Rochas, Forget Pill, Circles, 3,4-Methylenedioxymethamphetamine (MDMA) and any combination thereof (e.g., a material selected from one or any combination of the foregoing).

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DESCRIPTION OF PREFERRED EMBODIMENTS

Because certain aspects of illustrated embodiments of the present disclosure may be implemented in part using electronic components and circuits known to those skilled in the art, details will not be explained in any greater extent than that considered necessary as illustrated above, for the understanding and appreciation of certain underlying concepts and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Figure 1:
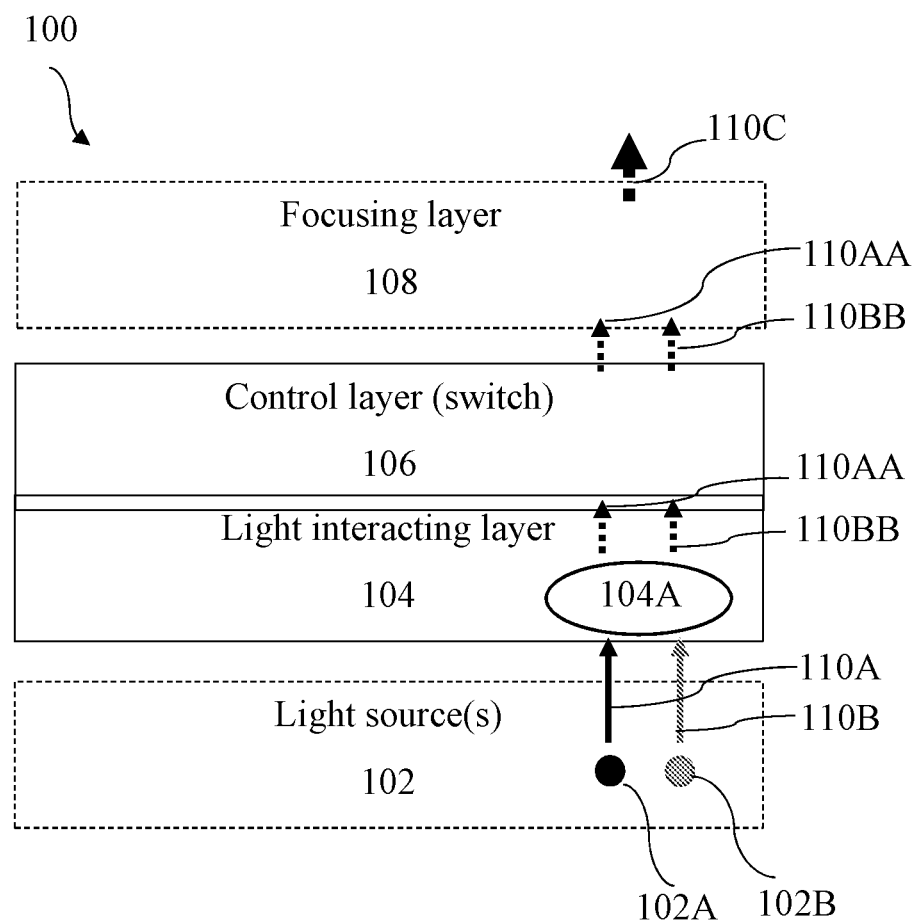
FIG. 1 illustrates, by way of a block diagram an exemplary, non-limiting, embodiment of a device 100 for producing an electromagnetic radiation of predetermined properties, in accordance with an embodiment.

Reference is made to FIG. 1 illustrating by way of a block diagram an exemplary, non-limiting, embodiment of a device 100 for producing an electromagnetic radiation of predetermined properties, in accordance with the present invention.

As shown, the device 100 includes a lighting/light source layer (system) 102, a light interacting layer 104 on top of the light source layer 102 and coupled thereto, and a light control (switch) layer 106 on top of the light interacting layer 104 and coupled thereto. As mentioned above, the device 100 may be configured with or without the light source layer 102 which may be provided separately. Optionally, the device 100 also includes a focusing layer system (e.g., a focusing lens or mirror) 108 on top of the switch layer 106 and coupled thereto, as will be further described below. The device 100 is configured to generate, by the light source system 102, coherent light beams having predetermined optical properties and transform the light beams to one or more electromagnetic radiations of predetermined properties. Specifically, the device 100 is configured and operable to generate light beams, typically two light beams, e.g., laser in the visible or infrared range, process the light beams by causing interaction/interference between the light beams and generate as an output an electromagnetic radiation in the terahertz range.

To this end, the light source system 102 includes one or more pairs of light sources (lasers), such as the pair of lasers 102A and 102B configured to generate a pair of light beams 110A and 110B respectively. The pair of light beams are configured to have similar, yet different, first and second frequencies, to enable an interference interaction therebetween. In at least one specific embodiment, the light source system 102 includes pairs of vertical-cavity surface-emitting lasers (VCSELs). This can be advantageous as will be further described below.

The term "vertical-cavity surface-emitting laser", or "VCSEL" refers hereinafter to a type of semiconductor laser diode with laser beam emission perpendicular from the top surface, contrary to edge-emitting semiconductor lasers (also in-plane lasers) which emit from surfaces formed by cleaving an individual chip out of a wafer.

The pair of light beams 110A and 110B travel into the second, light interacting, layer of the device 100, where they enter a light interacting/light mixing region 104A and an interference occurs therebetween inside the light interacting region resulting in an electromagnetic radiation having a third high-frequency profile, as exemplified by the two electromagnetic radiations 110AA and 110BB respectively. It is noted that, in some embodiments the electromagnetic radiation does not necessarily consist of two beams, as shown. Rather, in some embodiments, the electromagnetic radiation may be affected by the optical design of the interaction region 104A. In one specific non-limiting example, the resulting electromagnetic radiations 110AA and 110BB are in the terahertz frequency range. It is noted that each pair of the light beams, such as 110A and 110B, enter their dedicated light interacting region in the light interacting layer 104, such as light interacting region 104A.

In one specific non-limiting example, the light interacting regions are elliptical in their shapes. The elliptic ring structure of the elliptic mixer, varies the Fabry-Perot resonance of the cavity and hence blue-shifts the emission wavelength (frequency) of the VCSEL.

The interference between the light beams 110A and 110B is enabled, inter alia, due to the covering layer that functions as a control/switch 106. The switch 106 is a layer made of a material with controllable transparency to the electromagnetic radiation 110AA (and the identical 110BB). In other words, the switch 106 is selected to be opaque to the electromagnetic radiation and the two light beams 110A and 110B while the latter interact within the ring resonator, to thereby permit the interaction and production of the electromagnetic radiation of the third frequency. Then, the switch 106 is controllably moved to be in a transparent phase to the resulting electromagnetic radiation, thereby permitting the electromagnetic radiation to move on, as illustrated by the upper arrows 110AA and 110BB.

In some embodiments, the device 100 may also include a focusing layer (e.g., lens, mirror, or any other electromagnetic radiation focusing device) aligned with the output electromagnetic radiation to thereby apply focusing to the electromagnetic radiation. For example, as shown, the focusing device 108 is able to focus the two electromagnetic radiation beams 110AA and 110BB and generate a single output of focused electromagnetic radiation 110C. It should be noted that other focusing effects may be applied. For example, in some embodiments, each of the electromagnetic radiations 110AA and 110BB is focused on its own, resulting in two separate focused beams.

Accordingly, the device 100 is configured and operable to generate as an output one or more electromagnetic beams out of interaction between two or more light beams.

The device 100 can be used in a variety of applications. One specific, non-limiting, application is in sensing and determining sampled material properties.

Figure 2:
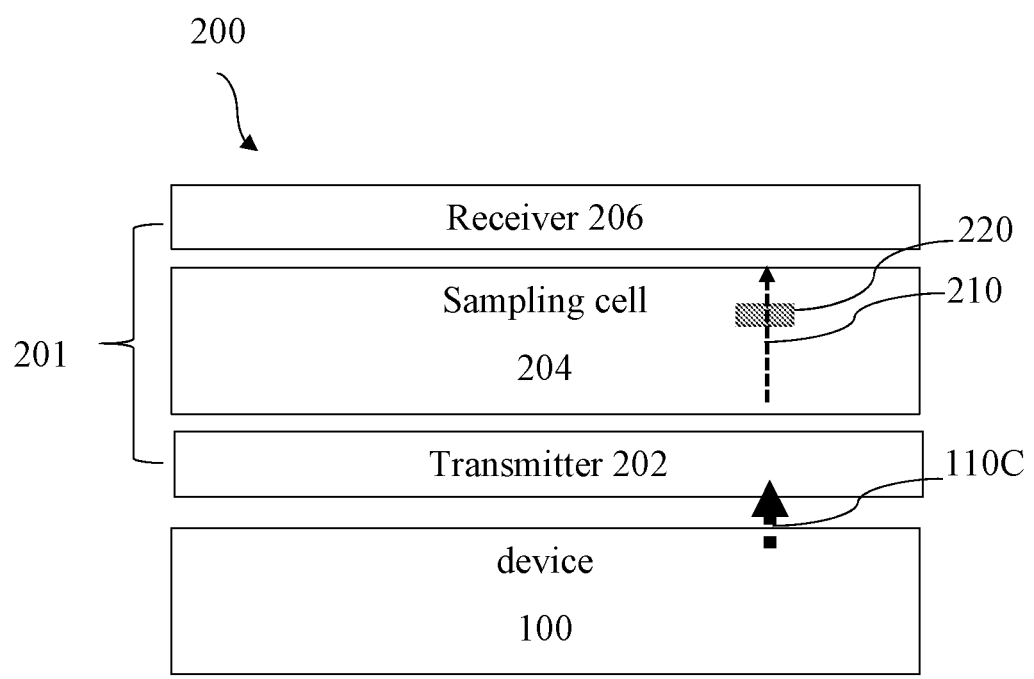
FIG. 2 illustrates, by way of a block diagram, a non-limiting example of a sensing device 200 that utilizes the device 100, for determining material properties of a sample.

Reference is made to FIG. 2 illustrating, by way of a block diagram, a non-limiting example of a sensing device 200 that utilizes the device 100, for determining material properties of a sample in accordance with at least one embodiment. In this example, the device 100 outputs electromagnetic radiation 110C, e.g., a focused electromagnetic radiation. The sampling device 200 include a sampling module 201 that includes a transmitter 202, a sampling cell 204 and a receiver 206. The sampling module 201 may be configured as an electron emission device. The transmitter 202 is configured as a photocathode configured and operable to receive the output electromagnetic radiation 110C and generate corresponding photo electrons 210 that travel through the sampling cell towards the receiver 206 which is configured as an anode, an interaction between the photo electrons and the sample 220 in the sampling cell is indicative of the one or more properties of the sample 220.

Reference is now made to FIGS. 3A to 3F illustrating one specific example of a sensing device 200A configured in an experiment conducted by the inventors relating to one or more embodiments. The sensing device 200A can be specifically implemented in a personal device such as a smartphone or a tablet.

The sensing device 200A includes a device for producing electromagnetic radiation in the terahertz range, where the light source system includes a plurality of pairs of VCSELs.

In at least one embodiment, at least one tunable vertical-cavity surface-emitting laser (VCSEL) is centered at wavelengths suitable for the application at scope where every two lasers are configured as a pair for creating a terahertz beating. At least one embodiment integrates a movable, single-layer, high-index-contrast subwavelength grating (HCG) as the VCSEL top mirror. Subwavelength gratings are diffraction gratings with physical dimensions less than the wavelength of incident light.

In some embodiments, single mode emission (SMSR>40 dB) and continuous wavelength tuning (~2.5 nm) at room temperature under continuous wave (CW) operation are realizable. The small footprint of HCG enables the scaling down of each of the parts dimensions by a factor of 10, leading to 1000 times reduction in mass, which may increase the mechanical resonant frequency and tuning speed. The energy and the size allow this sensing device to be part of handheld devices like telephones, watches, and tablets and implemented with IOT systems in general.

According to another embodiment, micro-electromechanical structures (MEMS) are integrated in the device.

The MEMS devices are interconnected with the light interacting layer (and/or with the photo-mixer) so as to enable phase modulation of the two light beams (e.g., laser in the visible or infrared range), causing interaction/interference between the light beams and create the output an electromagnetic radiation in the terahertz range.

The integration of micro-electromechanical structures (MEMS) with vertical-cavity surface emitting lasers (VCSELs) for the use of creating a THz beat has an ideal wavelength tunable source for a variety of applications, including telecommunications, biomolecular or chemical sensing, spectroscopy, and chip-scale atomic clocks. VCSELs and MEMS with THz structures are advantageous because they provide a large and continuous detection range with precise chemical pattern fingerprint. Accordingly, a VCSEL may be utilized with vertical layers of THz functional units in accordance with one or more embodiments.

In at least one embodiment, a fabrication process may include three sequential metal depositions, two vertical etches for structure formation, thermal oxidation, and one vertical followed by selective etch for HCG (High Contrast Grating) formation. The HCG may be patterned by electron-beam lithography on poly-methyl methacrylate (PMMA) photoresist, which permits proper alignment to the oxide aperture and design flexibility in terms of varying the grating period and duty cycle. However, in some embodiments, given the current state-of-art lithography technology, the HCG may alternatively be implemented by more efficient and low-cost methods such as nano-imprinting.

In some embodiments, a wet chemical-based selective etching followed by critical point drying is performed to remove the sacrificial material underneath the HCG layer and form the freely suspending grating structure that is supported by a nano-cantilever beam. Comparing to the RIE-based selective etch method, the chemical based selective etching achieves a very rapid fabrication cycle with very high etch selectivity and improves the device yield and reproducibility.

At least one embodiment of an exemplary device exhibits a lasing threshold current of 1.3 mA and an output power ~0.5 mW when biased at 2.3 times $I^{th}$ with a slope efficiency of 0.3 mW/mA that is commensurate with the technical requirements for particular applications.

FIGS. 3A-3C and 3E-3F show an example sensing device according to at least one embodiment.

Figure 3A:
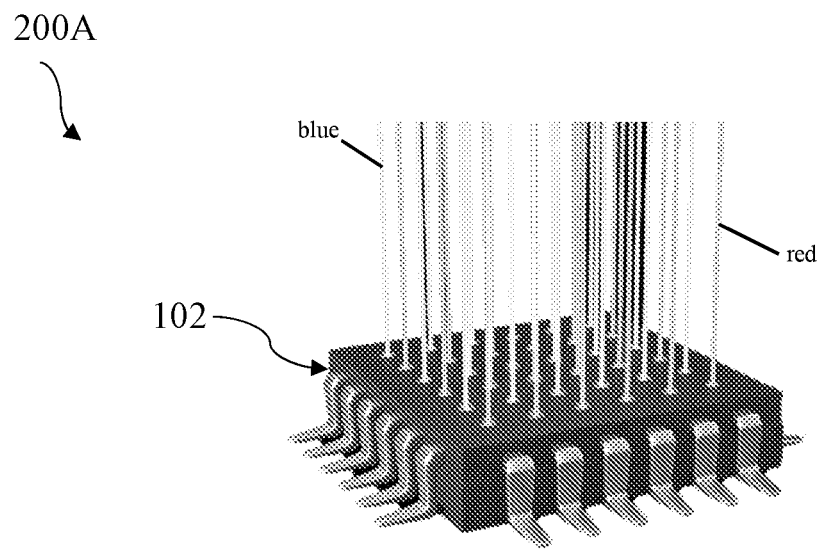
FIG. 3A illustrates a sensing device according to at least one embodiment, as configured in an experiment.
Figure 3B:
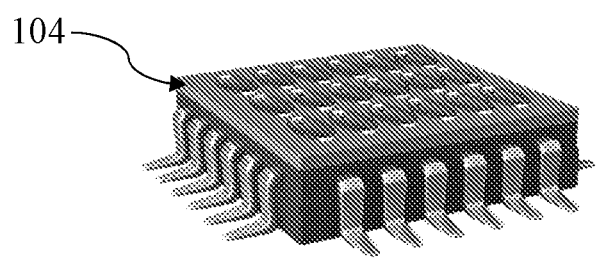
FIG. 3B illustrates a sensing device in accordance with at least one embodiment.
Figure 3C:
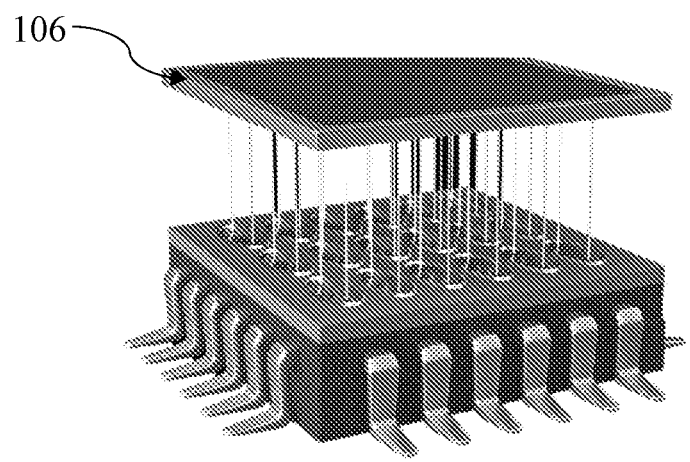
FIG. 3C illustrates a sensing device in accordance with at least one embodiment.
Figure 3D:
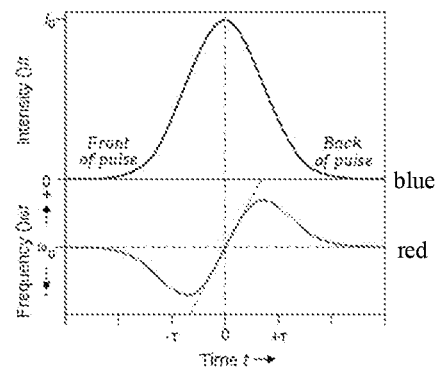
FIG. 3D illustrates frequency and intensity characteristics associated with a sensing device in accordance with at least one embodiment.
Figure 3E:
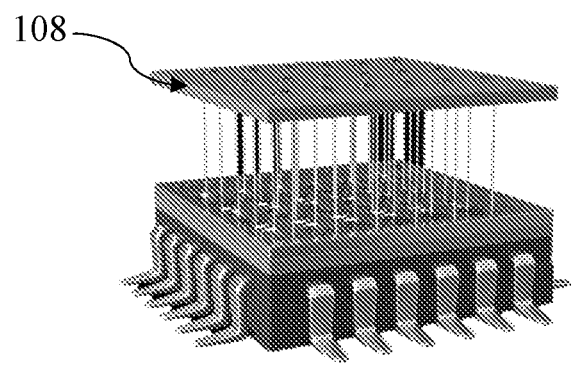
FIG. 3E illustrates a sensing device in accordance with at least one embodiment.
Figure 3F:
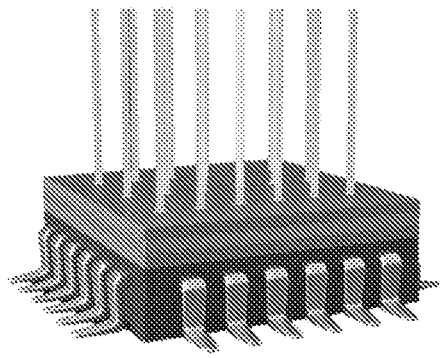
FIG. 3F illustrates a sensing device in accordance with at least one embodiment.

In FIG. 3D the frequency shift and beating phenomenon in the elliptical layer are illustrated.

A pulse (top curve) propagating through a nonlinear medium undergoes a self-frequency shift (bottom curve) due to self-phase modulation. The front of the pulse is shifted to lower frequencies, and the back to higher frequencies. In the center of the pulse the frequency shift is approximately linear.

For an ultrashort pulse with a Gaussian shape and constant phase, the intensity at time t is given by I(t):

$$I(t) = I_0 \exp\left(-\frac{t^2}{\tau^2}\right)$$

where $I_0$ is the peak intensity, and $\tau$ is half the pulse duration.

If the pulse is travelling in a medium, the optical Kerr effect produces a refractive index change with intensity:

$$n(I) = n_0 + n_2 \cdot I$$

where $n_0$ is the linear refractive index, and $n_2$ is the second-order nonlinear refractive index of the medium.

As the pulse propagates, the intensity at any point in the medium rises and then falls as the pulse goes past. This will produce a time-varying refractive index:

$$\frac{dn(I)}{dt} = n_2 \frac{dI}{dt} = n_2 \cdot I_0 \cdot \frac{-2t}{\tau^2} \cdot \exp\left(\frac{-t^2}{\tau^2}\right).$$

This variation in refractive index produces a shift in the instantaneous phase of the pulse:

$$\phi(t) = \omega_0 t - kz = \omega_0 t - \frac{2\pi}{\lambda_0} \cdot n(I) L$$

where Wo and Xo are the carrier frequency and (vacuum) wavelength of the pulse, and L is the distance the pulse has propagated. The phase shift results in a frequency shift of the pulse.

The instantaneous frequency $\omega(t)$ is given by:

$$\omega(t) = \frac{d\phi(t)}{dt} = \omega_0 - \frac{2\pi L}{\lambda_0} \frac{dn(I)}{dt},$$

and from the equation for dn/dt above, this is:

$$\omega(t) = \omega_0 + \frac{4\pi L n_2 I_0}{\lambda_0 \tau^2} \cdot t \cdot \exp\left(\frac{-t^2}{\tau^2}\right).$$

Plotting $\omega(t)$ shows the frequency shift of each part of the pulse. The leading edge shifts to lower frequencies ("redder" wavelengths), trailing edge to higher frequencies ("bluer") and the very peak of the pulse is not shifted. For the center portion of the pulse (between $t=\pm\tau/2$), there is an approximately linear frequency shift (chirp) given by:

$$\omega(t) = \omega_0 + \alpha \cdot t$$

where $\alpha$ is:

$$\alpha = \frac{d\omega}{dt}\bigg|_0 = \frac{4\pi L n_2 I_0}{\lambda_0 \tau^2}.$$

It is clear that the extra frequencies are generated through broadening of the frequency spectrum of the pulse symmetrically. In the time domain, the envelope of the pulse is not changed, however in any real medium the effects of dispersion will simultaneously act on the pulse. In regions of normal dispersion, the "redder" portions of the pulse have a higher velocity than the "blue" portions, and thus the front of the pulse moves faster than the back, broadening the pulse in time. In regions of anomalous dispersion, the opposite is true, and the pulse is compressed temporally and becomes shorter. This effect can be exploited to some degree (until it creates holes into the spectrum) to produce ultrashort pulse compression.

A similar analysis can be carried out for any pulse shape, such as the hyperbolic secant-squared ($sech^2$) pulse profile generated by most ultrashort pulse lasers.

If the pulse is of sufficient intensity, the spectral broadening process can balance with the temporal compression due to anomalous dispersion and consequently reaches an equilibrium state. The resulting pulse is called an optical soliton.

In at least one non-limiting example, the switch is an ultrafast switch which is made out of a metamaterial (artificial material) engineered to have properties that are not found in nature. Here, the metamaterial may include, for example, of nanoscale particles of vanadium dioxide ($VO_2$)—a crystalline solid that can rapidly switch back and forth between an opaque, metallic phase and a transparent, semiconducting phase—which are deposited on a glass substrate. In some embodiments, the metamaterial consists of $VO_2$.

Certain embodiments may utilize a switch incorporating vanadium dioxide having a number of characteristics that are advantageous for optoelectronics applications. In addition to their fast speed and small size, they are completely compatible with current integrated circuit technology, both silicon-based chips and the new "high-K dielectric" materials that the semiconductor industry is developing to continue the miniaturization process that has been a major aspect of microelectronics technology development. Further, such switches operate in the visible and near-infrared region of the spectrum that is optimal for telecommunications applications. In addition, such switches generate an amount of heat per operation that is low enough so that the switches can be packed tightly enough to make practical devices, e.g., about ten trillionths of a calorie (100 femtojoules) per bit.

Recently, intensive computational studies have illuminated the physics of vanadium oxide that underlies its semiconductor-to-metal transition. In particular, ultrafast photo induced phase transitions may revolutionize data-storage and telecommunications technologies by modulating signals in integrated nanocircuits at terahertz speeds. In quantum phase-changing materials (PCMs), microscopic charge, lattice, and orbital, degrees of freedom interact cooperatively to modify macroscopic electrical and optical properties. Although these interactions are well documented for bulk single crystals and thin films, little is known about the ultrafast dynamics of nanostructured PCMs when interfaced to another class of materials as in this case to activate plasmonic elements. Here, as a non-limiting embodiment, the inventors demonstrated that a mesh of gold nanoparticles, acting as a plasmonic photocathode, induces an ultrafast phase transition in nanostructured vanadium dioxide ($VO_2$) when illuminated by a spectrally resonant femtosecond laser pulse. Hot electrons created by optical excitation of the surface-plasmon resonance in the gold nanomesh are injected ballistically across the Au/$VO_2$ interface to induce a sub-picosecond phase transformation in $VO_2$. Density functional calculations show that a critical density of injected electrons leads to a catastrophic collapse of the 6 THz phonon mode, which has been linked in different experiments to VO2 phase transition. The demonstration of sub picosecond phase transformations that are triggered by optically induced electron injection opens the possibility of designing hybrid nanostructures with unique non-equilibrium properties as a critical step for all-optical nanophotonic devices with optimizable switching thresholds.

Figure 4:
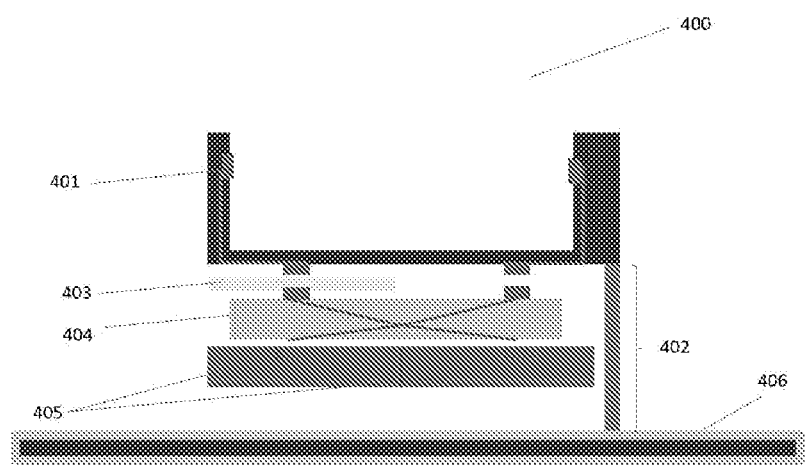
FIG. 4 illustrates an exemplary non-limiting embodiment of a device 400 for producing an electromagnetic radiation of predetermined properties.

Reference is now made to FIG. 4 which illustrates by way of a block diagram an exemplary, non-limiting, embodiment of a device 400 for producing an electromagnetic radiation of predetermined properties. One utilization of device 400 is a sensing device (a sensor or sensor system).

According to this embodiment, a modulator 406 having a mother board control having a printed circuit board (PCB) is connected to a modulation module 402. The modulator may include a microcontroller (e.g., microcomputer) having a processor and a non-volatile memory, in some embodiments.

The modulation module 402 comprises at least 2 coherent light emitters sources (e.g., vertical-cavity surface-emitting lasers, VCSELs) 405.

The VCSELs 405 are connected to at least one coupler, 404 (the light interacting layer). The coupler 404 is connected to a phase modulator (e.g., MEMS) 403 which is connected with a photo-mixer 401.

As described above, the coupler (the light interacting layer) includes one or more light interacting regions, each configured to define a closed-loop light mixing path for optically coupling a pair of input coherent light components of predetermined first and second frequencies to create an output radiation component of an output beating frequency of a predetermined high-frequency profile.

Furthermore, as described above, according to one embodiment, the coupler may comprise a control layer interfacing said light interacting layer, said control layer being configured for controllable switching between its inoperative opaque state and operative transparent state with respect to the output beating frequency (in the THz range), to therefore selectively prevent and allow transmission of the at least one output radiation component of the output beating frequency towards a medium in the vicinity of the layered structure.

Figure 5:
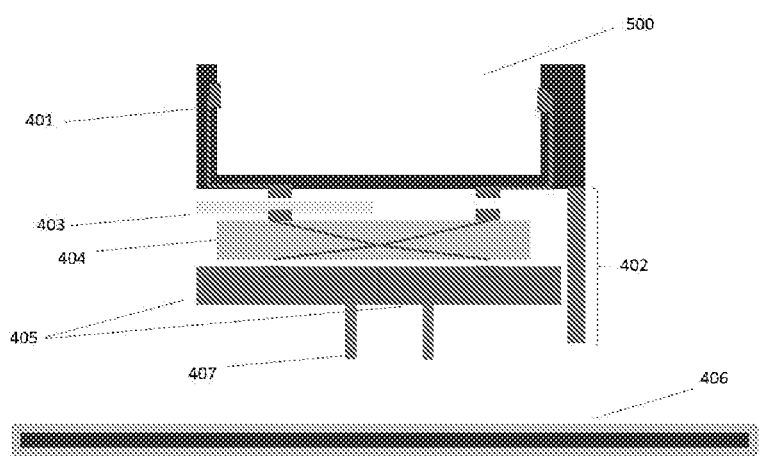
FIG. 5 illustrates an exemplary non-limiting embodiment of a device 500 for producing an electromagnetic radiation of predetermined properties.

Reference is now made to FIG. 5 which illustrates by way of a block diagram an exemplary, non-limiting, embodiment of a device 500 for producing an electromagnetic radiation of predetermined properties, in accordance with the present invention. One utilization of device 500 is a sensing device (a sensor or sensor system).

Device 500 is substantially the same as device 400 (illustrated in FIG. 4) but the modulator 406 (e.g., the mother board controller or PC) is not integrated in the device but externally thereof. In such an embodiment, device 500 further comprises at least two lasers having an interconnection 407, connected with the coherent light emitters' sources (e.g., vertical-cavity surface-emitting lasers, VCSELs) 405.

In some embodiments, the coupler 404 may include, but is not limited to, a fused nano fiber coupler, a coupler on chip silicon on insulator (SOI) assembly, as discussed in more detail below, or an integrated phase modulator chip.

The term "silicon on insulator" or "SOI" refers hereinafter to a fabrication of silicon semiconductor devices in a layered silicon-insulator-silicon substrate, to reduce parasitic capacitance within the device, thereby improving performance. SOI-based devices differ from conventional silicon-built devices in that the silicon junction is above an electrical insulator, typically silicon dioxide or sapphire (these types of devices are called silicon on sapphire, or SOS). The choice of insulator depends largely on the particular application, with sapphire being used for high-performance radio frequency (RF) and radiation-sensitive applications, and silicon dioxide for diminished short-channel effects in other microelectronics devices. The insulating layer and topmost silicon layer also vary widely with application.

According to at least one embodiment, the coupler may include, but is not limited to, a fused nano fiber coupler, a coupler on chip SOT assembly, or a separated packaged-phase modulator chip (internal design).

Further, as described above, certain embodiments include a sensing device that can utilize any of the above described devices for creating electromagnetic radiation, namely in the THz range.

According to various embodiments, the sensing device can utilize the device 100, 400, 500, for determining material properties of a sample. In at least one embodiment, the device outputs electromagnetic radiation, e.g., a focused electromagnetic radiation. The sampling device include a sampler (sampling module) that includes a transmitter, a sampling cell and a receiver.

The sampler in at least one embodiment may include a modulation frequency interconnection and an optical packaged waveguide. The optical waveguide packaging solution may be based on ceramic or SOT or organic board or semiconductor technology. The transmitter/receiver module in the sampling module may also include a heat dissipation solution.

The sampler may be configured as an electron emission device. The transmitter can be configured as a photocathode configured and operable to receive the output electromagnetic radiation and generate corresponding photo electrons that travel through the sampling cell towards the receiver which is configured as an anode, an interaction between the photo electrons and the sample in the sampling cell is indicative of the one or more properties of the sample.

According to another embodiment, the sensing device may include a suction module adapted to apply suction on said sample so as to 'collect' at least one volatile compound, (VC), from said sample. Said VC is evacuated into said sampling cell to be analyzed by said coupler by means of said output beating frequency of a predetermined high-frequency profile (in the THz range).

It is expected that the output frequency in the THz range may be used to identify one or more properties (e.g., compounds) in the sample being tested. The compounds may include, but are not limited to, a date-rape drug (e.g., Zolpidem, Ambien, Benzodiazepines, Valium, Librium, Xanax, Ativan, Rohypnol, Whitleys, Trip-and-Fall, Ruffles, Rophies, Rope, Roopies, Roofies, Roches, Roach-2, Roach, Mind Erasers, Rib, Lunch Money, R-2, Poor Man's Quaalude, Mexican Valium, LA Rochas, Forget Pill, Circles, 3,4-Methyl enedioxymethamphetamine (MDMA)).

The properties detected may include fingerprint characteristics (a spectroscopic signature) of a VC being detected from a sample for identification thereof.

The term "volatiles" or "volatiles compound" or "VCs" generally refers herein below to volatile compound and/or mix of compounds or materials. According to one embodiment, the VCs can be organic compound and/or mix of compounds or inorganic compound and/or mix of compounds. Embodiments wherein the VC is a mix of organic and inorganic compound(s) are also within the scope of the present disclosure The term "THz radiation" generally refers herein below to any of the electromagnetic wave frequencies that lie in the range extending from around 100 GHz to 30 THz.

According to another embodiment the sensing device additionally comprises at least one suction module adapted to apply suction to said sample and to thereby capture volatile compounds in said sampling module.

According to another embodiment the sensing device additionally comprises at least one membrane adapted to ensure suction of said volatile compounds in said sampling module and seal thereof.

According to another embodiment the sensing device additionally comprising means adapted to release said volatile compounds from said sampling module after determination of said one or more properties of said sample by means of said sensing device.

According to another embodiment the sensing device additionally comprising means adapted to clean (e.g., a cleaner) said volatile compounds from said sampling module after determination of said one or more properties of said sample by means of said sensing device. For example, in some embodiments, a pressure source in the form of a pump configured to supply negative or positive pressure may be actuated by a switch or by a pulse-width-modulation (PWM) controller to apply negative pressure so as to create a vacuum. When pressure is applied, particles of the compound may move from the sampler to an outlet or discharge port (discharge area or release means) to thereby be released from the sampler.

According to another embodiment the sample is in gas, liquid, solid or fluid phase.

According to another embodiment the sensing device is being configured and operable for use in any TOT device, personal device, a smartphone, a tablet or a computer.

According to another embodiment the volatile compounds or said sample is a material selected from a group consisting of Dimethyl Ether, Isoprene, Methyl Nitrate, Methyl Cyanide, Chloromethane, Acetaldehyde, Acetone, HCN, Water, Ethanol, Methanol, Ethyl Benzene, CO, Formaldehyde, Butyraldehyde Toluene, Butyric Acid, Propionic Acid, Dimethyl Sulfide and Pyruvic Acid, Zolpidem, Ambien, Benzodiazepines, Valium, Librium, Xanax, Ativan, Rohypnol, Whitleys, Trip-and-Fall, Ruffles, Rophies, Rope, Roopies, Roofies, Roches, Roach-2, Roach, Mind Erasers, Rib, Lunch Money, R-2, Poor Man's Quaalude, Mexican Valium, LA Rochas, Forget Pill, Circles, 3,4-Methylenedioxymethamphetamine (MDMA) and any combination thereof.

According to one embodiment, the sensing device as described above can be utilized for food spoilage detection by seeking for biological/chemical signature, indoor air quality monitoring, vital/environmental sensing (e.g., contact free blood scanning).

The terms "comprises", "comprising", "includes", "including", "having" and their conjugates mean "including but not limited to".

The term "consisting of means "including and limited to".

The term "consisting essentially of means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts. As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements. Various embodiments and aspects of the present invention as delineated hereinabove and as claimed in the claims section below find experimental support in the following examples.

EXAMPLES

Chemical Analysis of VOCs by Means of Terahertz Eigen Spectroscopy Terahertz spectroscopy, due to the high sensitivity and specificity that it affords, has been incorporated in many fields to aid in the chemical analysis of gases. One potential application is to detect markers in the air for sensing applications. The aim of this example is to establish a relationship between several chemicals and the hydration shells levels. 20 chemical including Acetone, Carbon monoxide (CO), Methanol were studied. Samples were processed through a no-concentration trap chamber system before being inspected.

With the advances in AI technologies, the non-invasive air analyses for diagnosing and monitoring chemicals is becoming feasible. Over 3000 trace gases are reported to be presented in the air.

In the following example, the gas composition is studied in an attempt to establish correlations with their chemical nature and levels of concentration. Currently, several techniques are used for gas analysis, such as mass spectrometry (MS) based methods, infrared spectroscopic sensors, electrochemical sensors, and carbon nanotube sensors. The majority of the gas analysis research uses mass spectrometry (MS) combined with gas chromatography (GC). GC-MS systems have limited specificity in the analysis of a complicated mixture of gases. High specificity is one of the most important characteristics of chemical sensors utilizing Terahertz Eigen spectroscopy. Based on correlations established in this study, twenty (20) chemicals were picked to be monitored in the air. In experiments, the concentration of those twenty chemicals along with preliminary results showed that the sugar levels appeared to be negatively proportional to the concentration of food Acetone, Methanol, and Acetaldehyde at the air sample from food.

Resolution Limitation

The THz range is where the molecular rotational energy transitions occur. The rotational transitions contain the information on chemicals' symmetry and structure, which is very important in the studies of the chemicals' dynamics, the identification of chemicals in space or the chemical detection in complex mixtures. In this example, it is used for the detection of volatile organic compounds (VOCs) in air.

For a rigid heteronuclear molecule with a permanent electric dipole moment (such as CO), the allowed transition frequencies can be calculated in MHz using the following formula:

$$v_1 = 2B(j+1)$$

where B is the rotational constant measured in MHz, inversely proportional to a rotational moment of inertia, and J is the total angular momentum quantum number.

The typical rotational spectrum of a diatomic molecule consists of a set of equally spaced lines separated by 2B. The distribution of the state occupancies is described by Boltzmann distribution. As a result, the density of states is dependent on both the temperature and the state energy. Further, the intensities of the rotational transitions are determined by the transition dipole moment and the population differences between two levels. In order to obtain desired sensitivity and specificity, a range was selected which contains a large number of reasonably high-intensity lines for the chemicals to be detected in air samples, such as Acetone, Methanol, and Carbon monoxide. Based on the ongoing research the 210-270 GHz was selected as the spectral range for two reasons. First, the majority of relevant chemicals have strong lines in this region, which is necessary for chemical detection and quantitative analysis. Second, the atmosphere is transparent, which means no strong line for water, carbon dioxide and oxygen which lead to better hydration detection.

Pressure Broadening

One traditional explanation of the pressure broadening effect is that in the emission process, the emitting particle is perturbed by a collision with another particle; as a result, the uncertainty in the energy emitted will increase due to the shortening of the characteristic time of the collision. Thus, the excessive sample pressure broadens the spectral lines, which may lead to overlaps between close lines and the reduction of the number of resolution elements, which lowers the specificity of the system. However, in the lower pressure regime, before the onset of excessive pressure broadening, higher sample pressures correspond to higher line intensities. In the experiment, the $2^{nd}$ derivative of the absorption intensity is measured, with the frequency modulation, and the peak to the peak value of the $2^{nd}$ derivative of the intensity is called "intensity" in the later text.

Figure 6:
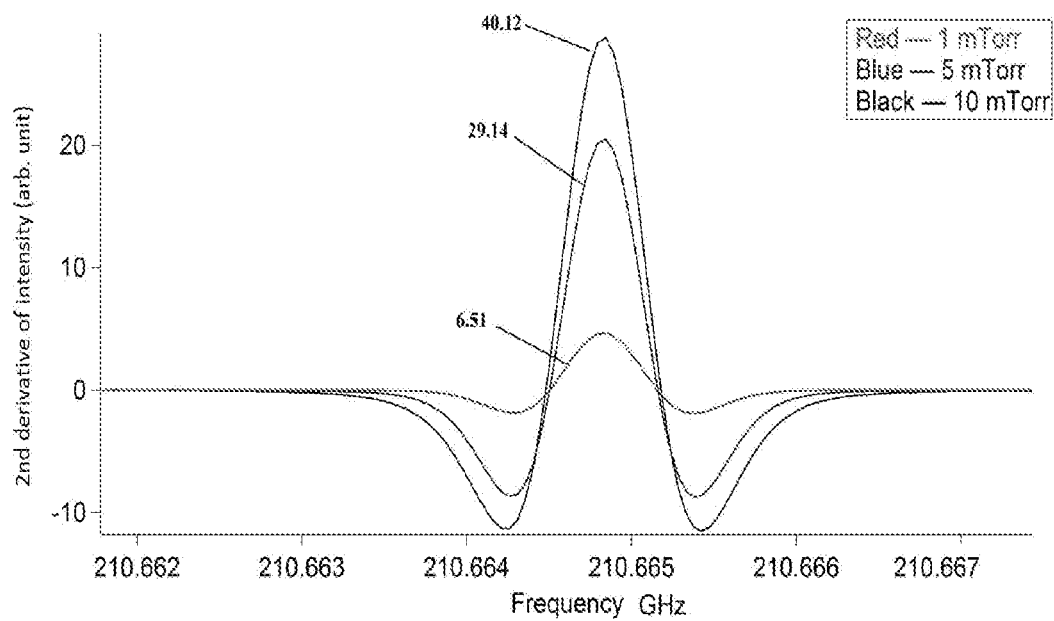
FIG. 6 illustrates the pressure broadening in the pure sample of ethanol. Intensities are measured from the peak to the bottom of the negative going lobes, where black (10 mTorr) has the highest peak, blue (5 mTorr) the next highest, and red (1 mTorr) the lowest, with the same relative order appearing in FIG. 12.

In the following experiment, the pressure usually ranges from 10 mTorr to 50 mTorr, which leads to a pressure broadening of the line shape to 100-500 kHz. And in pure samples, the intensities of transition lines are positively correlated to the samples' pressure. As is shown in FIG. 6, the spectrum of Ethanol was recorded at three pressures, 1 mTorr, 5 mTorr, and 10 mTorr. The line intensities scale respectively by 1, 4.5, and 6.16. After 5 mTorr, the increase of the intensity is slower than the increase of pressure for Ethanol. As a self-broadening (where the lines are broadened by collisions with only one chemical), there exists a maximum pressure after which the intensity of the transition is not increased anymore and only the line width keeps increasing. However, as it is shown in FIG. 6, the self-broadening has a minor influence on the total line width in these experiments. In atmospheric mixtures, the pressure broadening mechanism is different, because lines are mostly broadened by other chemicals. The theoretical calculation for the foreign broadening is difficult because multiple broadening agents may have different influence on the broadening. Experimentally, the typical pressure broadening coefficients are about 10 MHz per Torr for line width. In order to both maximize the transitions' intensity and minimize the pressure broadening, 50 mTorr is set to be the pressure limit for a general spectral scan of air.

Besides pressure broadening, the majority of the line shape broadening is from the Doppler Effect. Doppler broadening is caused by the thermal motion of molecules. Doppler broadening is a function of temperature and molecular mass, but generally is ~1 MHz at room temperature. In the experiments, the line width is usually slightly over 1 MHz (1.03 MHz for the black trace in FIG. 1). So, in the experiments, the Doppler broadening usually sets the limits of the spectral resolution. In the Doppler regime spectral line intensity scales linearly with pressure, thus, data shown in FIG. 6 are somewhat affected by pressure broadening.

Comparison of THz Eigen Spectroscopy and Other Techniques

Within the several different analytical methods applied to the air analysis, GC-MS is one of the most common techniques. The GC instruments are used to separate compounds into their various components. The MS instruments measure mass-to-charge ratio from the chemicals' fragments. GC-MS systems are capable of chemical detection at parts per billion (ppb) or even at parts per trillion (ppt). However, in order to perform the trace level analysis, a large amount of sample is necessary, which requires large and complicated trapping and desorption systems. Due to the ambiguity in MS fragmentation and the similarity in retention times in GC column, the whole trapping-desorption-GC-MS system needs to be calibrated for every mixture on the detected list and false positives/negatives are still possible.

Laser spectroscopic sensors have good sensitivity for chemical detection in the gas sample. However, a large proportion of these techniques operate in the Visible/Infrared spectral regions. As a result, the specificity of these sensors in mixtures is limited by spectral congestion due to the increased Doppler broadening. Thus, these sensors prefer light chemicals with a few widely spaced lines, which only contain a small range of chemicals.

Compared to other techniques, chemical sensors operating in the THz spectral range have the "absolute" specificity defined by the uniqueness of the spectral signatures. As a result, the probability of a false alarm is vanishingly small. Besides, the identification of chemicals is based on the spectral patterns, intensities and frequencies, which are independent of systems. Due to these characteristics, the daily calibration of the whole system is not needed, which is the problem of GC-MS based systems. In addition, Terahertz sensors can detect a wide range of chemicals. Because of the good performance and convenience of THz rotational spectroscopy, it is expected to be preferable for gas analysis.

Compared to other THz techniques, chemical sensors operating in THz Eigen spectral range, identification of chemicals is based on the spectral patterns, intensities and frequencies, which are independent of systems are not the only fingerprint characters for identification. Due to these characteristics, AI techniques may be utilized. In addition, terahertz sensors can detect a wide range of chemicals. Because of the good performance and convenience of THz Eigen spectroscopy, THz may be the only feasible option for gas analysis in IT systems.

Target Chemicals

There has been a significant amount of research conducted on gas analysis by utilizing GC-MS. The correlation of VOCs in air and emission from living bodies were studied by many groups in the past decades, and some chemicals such as carbon monoxide, hydrogen cyanide (HCN), and methyl cyanide are reported as potential biomarkers for health conditions, bacterial and disease processes. Another angle for the findings due to the fact that carbon monoxide (CO) is a product of Heme oxygenase (HO) activity, the level of CO might be another potential marker of health diagnosing for non-smokers.

As for the correlation found in studies of microbial growth, the concentration of some other products from metabolism were also reported to be related to metabolizing levels. Acetaldehyde was confirmed to be metabolized from Ethanol. The concentration of formaldehyde in the colony was found positively proportional to the total concentration of methanol and ethanol. Toluene was reported to have a higher concentration of sugar in the LB.

Figure 7:
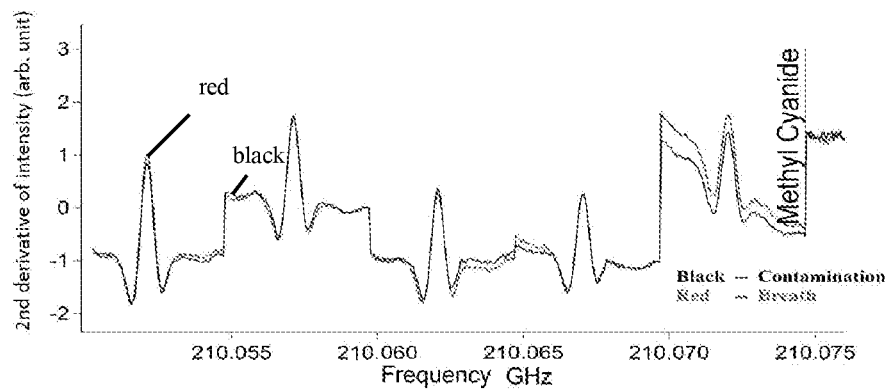
FIG. 7 illustrates contamination of a cell with methyl cyanide.
Figure 8:
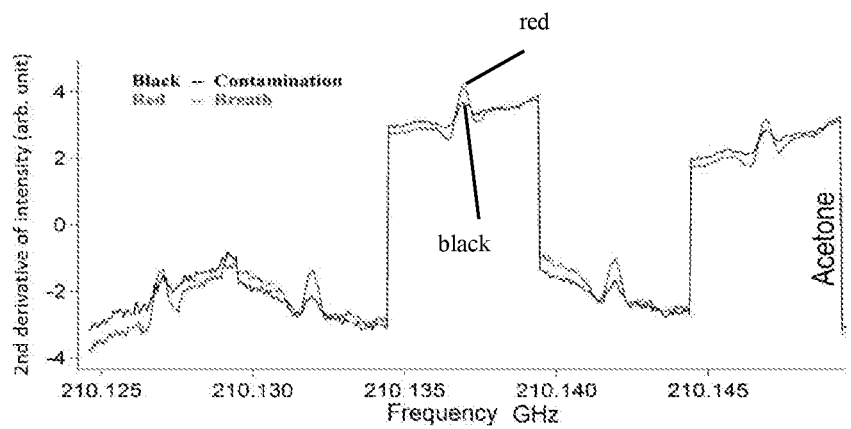
FIG. 8 illustrates contamination of a cell with aceton.

Based on these results, a list of chemicals to be detected in the colony was created. Acetone, Methyl Nitrate, Methanol, Isoprene, Acetaldehyde, Ethanol, Formaldehyde, Toluene and CO were added into the list because of the potential correlation to the colony metabolizing levels. Methyl Cyanide, HCN, Water, and Chloromethane were found. Several more chemicals which may have diagnostic relevance to colony growth assessment were added into the list such as, Butyric Acid, Butyraldehyde, Propionic Acid, Dimethyl sulfide, and Dimethyl ether. In total, 20 chemicals are in the sampling list (see FIG. 7 which illustrates contamination of Cell with Methyl Cyanide; and FIG. 8 which illustrates contamination of Cell with Aceton).

The air sample is injected into an absorption cell directly without taking in consideration of the low concentration of the target chemicals (usually lower than ppm) and the high concentration of other air components (over 99%). It is not necessary to remove the major components in the air to minimize the pressure broadening before the spectral acquisition due to the Eigen spectroscopy method, such as oxygen, nitrogen and argon. The desorption of trapped chemicals inside the sorbent tubes is performed in a custom-built chamber apparatus, with current dimensions of 6×6×4 mm.

Colony Gas Experiment Procedure

The procedures that were followed in taking gas samples consisted of three major steps.

The first step was to establish spectral libraries for target chemicals. It has started with a collection of an overview (210-270 GHz) spectrum for each target chemicals at 10 mTorr. (Expect for HCN, which was done at 1 mTorr due to near 100% absorption). Then, 5 strongest lines were picked as fingerprints for each chemical. (HCN, CO, and Water only have 3, 1, and 4 strong lines respectively in the region 210-270 GHz). Selected lines were put into a snippet list; snippet is a 5 MHz wide region centered at the frequency of a selected line. Then pure samples of each chemical at 1 mTorr, 5 mTorr, and 10 mTorr were injected into the cell and the snippet libraries were collected for all the chemicals.

The second step was to prepare the gas colony sample for analysis. There were 2 approaches to the collection of the gas samples. In one approach, the gas was placed into a cuvette. In another approach, the gas was upload into the sorbent tube.

In the last step, the recorded spectrum was analyzed for the concentrations of the chemicals. All spectra were normalized by the corresponding gains from amplifiers. To account for system specific frequency-dependent variations of the transmitted power, every spectrum was divided by the corresponding empty cell coupled signal. The spectral lines were then compared to the corresponding libraries recorded at different sample pressures, and the library with closest pressure broadening was selected for dilution calculation. At this stage, the pressure broadening of both spectra was assumed to be the same. Then the line intensities' ratio of the library and the gas scans was calculated.

The partial pressures of target chemicals in the absorption cell were calculated using $$P = P_i * \frac{I1}{I2}$$

where P is the partial pressure inside the cell and $P_1$ is the pressure from the library with closest pressure broadening. I1 and I2 are the normalized line intensity from the gas scan and the library.

Assuming the ideal gas law, the chemical dilution in the gas sample is calculated using $$\text{Concentration} = P * \frac{Vc}{Vb} * \frac{Tb}{Tc} * \frac{1}{Patm} * n$$

where Vc and Vb is the volume of an exemplary absorption cell two sizes, Tb and Tc are the temperature for the gas sample (333K), and is the temperature for the absorption cell (293 K), is the atmospheric pressure 760,000 mTorr, and Neff is the preconcentration efficiency.

Library Creation

Among the twenty chemicals in a target list, several pure chemicals are stored in high-pressure gas canisters, such as Carbon monoxide. Those gaseous pure samples were injected into the cell directly without any special treatment.

Figure 9:
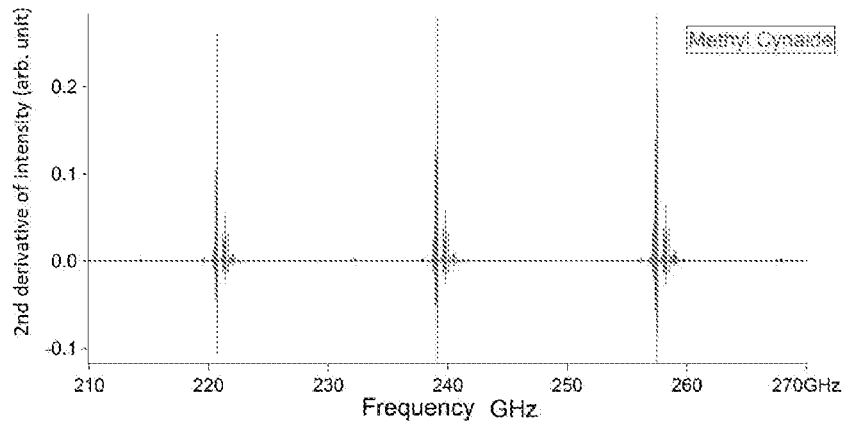
FIG. 9 illustrates an overview spectrum for methyl cyanide from 210 to 270 GHz.
Figure 10:
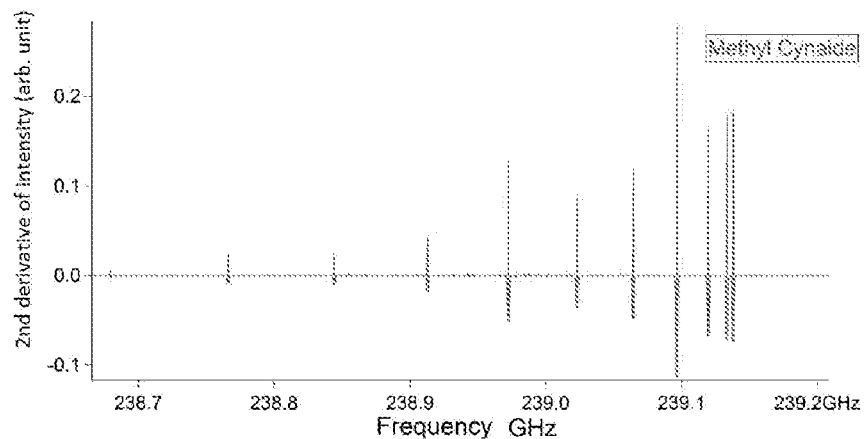
FIG. 10 illustrates an overview spectrum for methyl cyanide near 240 GHz.
Figure 11:
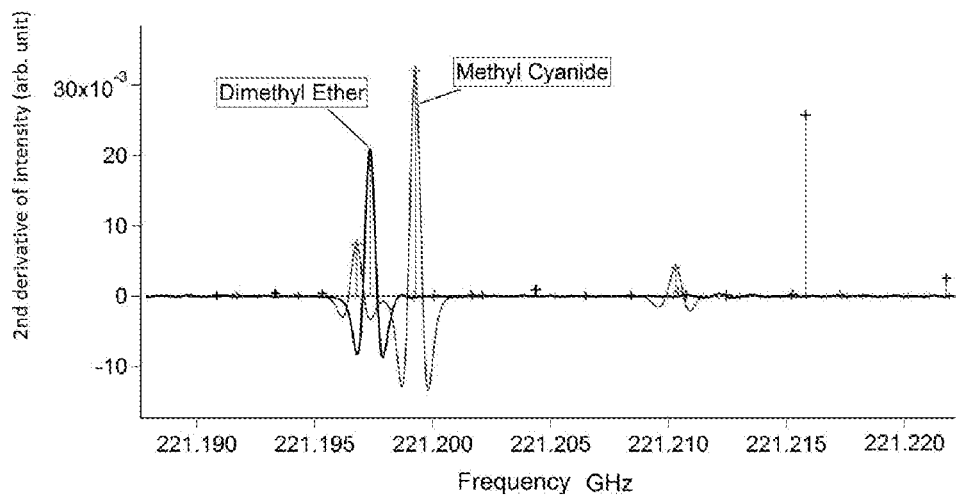
FIG. 11 illustrates an overview spectrum for a composition overlaid with at least one other chemical spectrum.

Chemicals were released into the absorption cell. With the pressure control in the cell set to 10 mTorr, an overview spectrum was then taken for each chemical from 210 to 270 GHz at 10 mTorr (see FIGS. 9-10). Methyl Cyanide has three major clusters of lines, the separation between two adjacent clusters is roughly determined by the rotational constant B, which was discussed before. All the spectral lines have been normalized by the power and gains.

Five strongest lines were picked for each chemical as their fingerprints.

After all the lines were selected, the snippets libraries were created. A snippet is a 5 MHz scan centered at the frequency of a single line in the spectrum. For the 20 chemicals, 84 snippets were selected.

Figure 12:
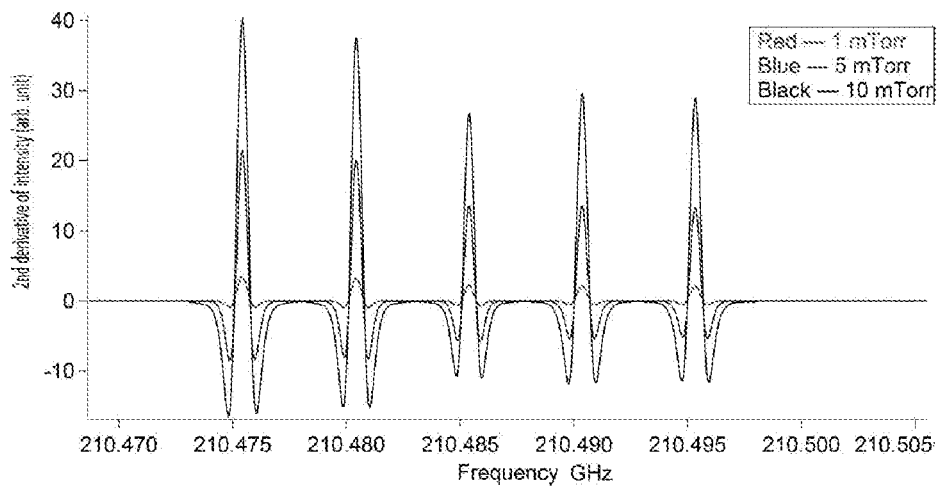
FIG. 12 illustrates an overview spectrum for a composition overlaid with at least one other chemical spectrum.
Figure 13:
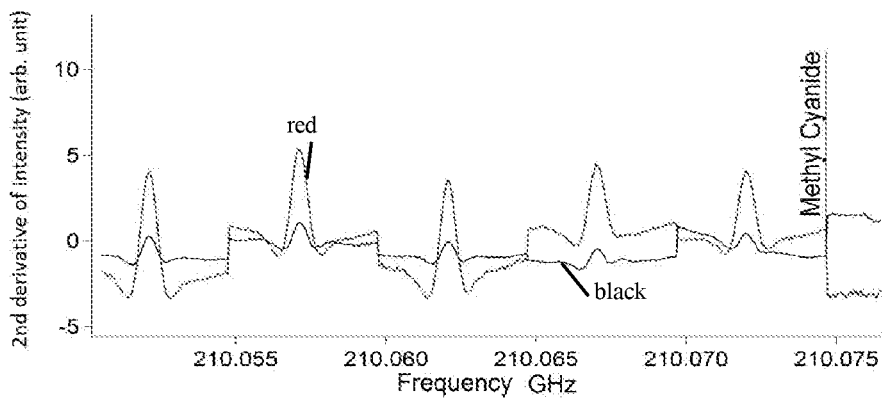
FIG. 13 illustrates an overview spectrum for a composition overlaid with at least one other chemical spectrum.
Figure 14:
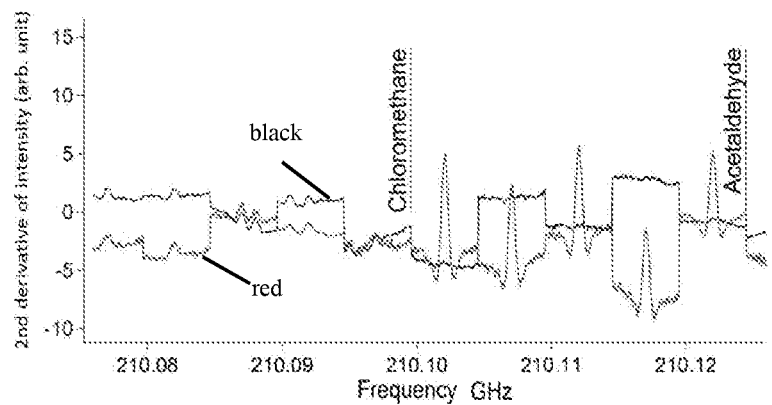
FIG. 14 illustrates an overview spectrum for a composition overlaid with at least one other chemical spectrum.
Figure 15:
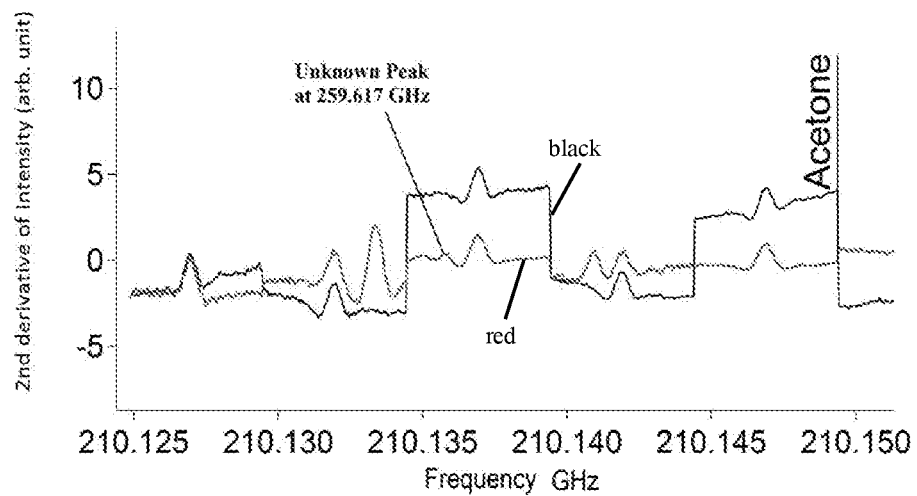
FIG. 15 illustrates an overview spectrum for a composition overlaid with at least one other chemical spectrum.
Figure 16:
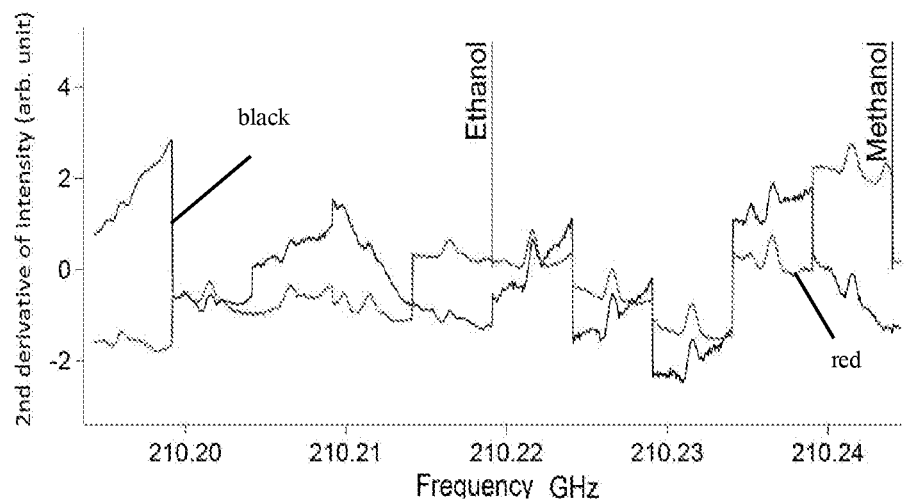
FIG. 16 illustrates an overview spectrum for a composition overlaid with at least one other chemical spectrum.
Figure 17:
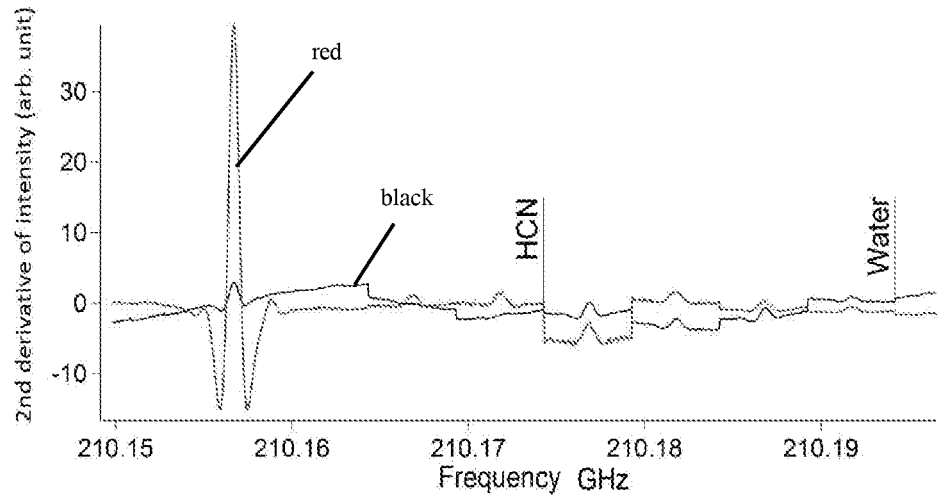
FIG. 17 illustrates an overview spectrum for a composition overlaid with at least one other chemical spectrum.
Figure 18:
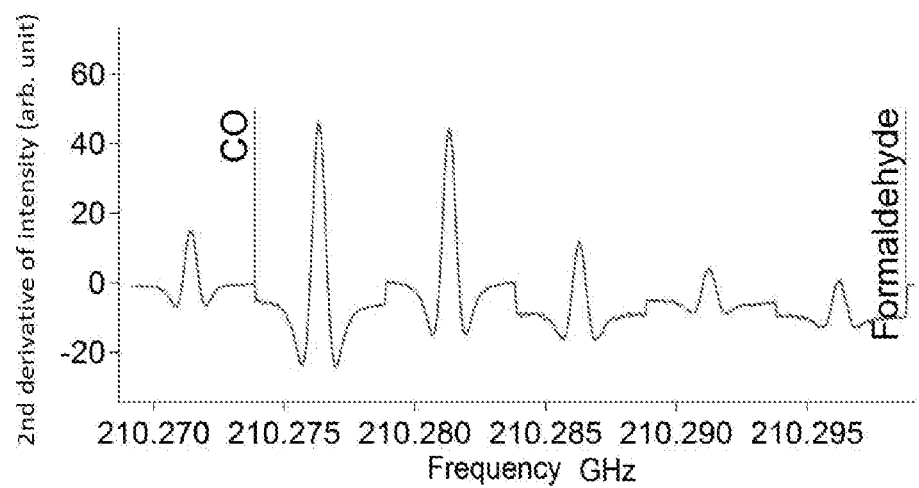
FIG. 18 illustrates an overview spectrum for a composition overlaid with at least one other chemical spectrum.
Figure 19:
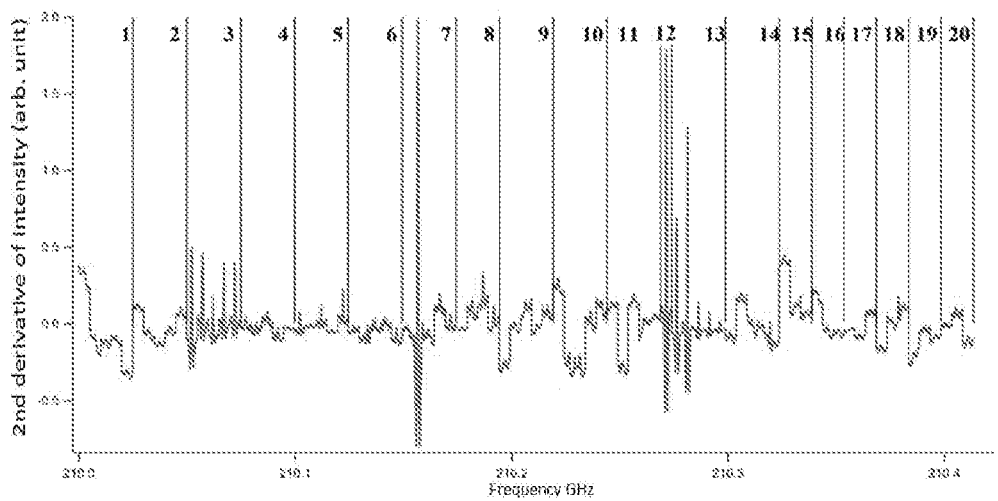
FIG. 19 illustrates an overview spectrum for a composition overlaid with at least one other chemical spectrum.

Because of the non-linearity in intensities caused by the pressure broadening, the snippets library was set up at the pressures of 1, 5 and 10 mTorr. A set of Methyl Cyanide snippet library entries are shown as an example (see FIGS. 11-19; where FIG. 12 illustrates a snippet library for Methyl Cyanide at 1 mTorr, 5 mTorr, 10 mTorr; FIG. 13 illustrates Methyl Cyanide comparison of two preconcentration systems; FIG. 14 illustrates Chloromethane and Acetaldehyde comparison of two preconcentration systems; FIG. 15 illustrates Acetone comparison of two preconcentration systems; FIG. 16 illustrates Ethanol and Methanol comparison of two preconcentration systems; FIGS. 17-18 illustrates HCN and Water comparison of two preconcentration system; FIG. 19 illustrates a sample Snippet Spectrum for a colony).

The concentration of each detectable chemical is calculated first. Then, assuming the $2^{nd}$ derivative of the intensity is positively proportional to the partial pressure, the minimum amount of the target chemical can be determined by the detected amount of chemical divided by the signal to noise ratio.

The following table illustrates the sensitivity of two cells with different no-concentration method:

|   | Chemicals | Normal Colony Gas | Sensitivity (Large cell) | Sensitivity (Small Cell) |
|---|---|---|---|---|
| 1 | Isoprene | 50-1000 ppb | 1200 ppb | 98 ppb |
| 2 | Methyl Nitrate | 10-30 ppt | 3 ppb | 10 ppq |
| 3 | Methyl Cyanide | 5.6 ppb | 6 ppt | 60 ppq |
| 4 | Chloromethane | — | 33 ppb | 2.2 ppb |
| 5 | Acetaldehyde | 104 ppb | 10 ppb | 1.6 ppb |
| 6 | Acetone | 177-3490 ppb | 68 ppb | 1 1 ppb |
| 7 | HCN | 4 ppb | 0.5 ppb | 14 ppt |
| 8 | Water | | | |
| 9 | Ethanol | 1663 ppb | 24 ppb | 2.4 ppb |
| 10 | Methanol | 1684 ppb | 8.1 ppb | 3 ppb |
| 11 | Ethyl Benzene | 0.18 ppb | 8 ppt | 10 ppq |
| 12 | CO | 6.1 ppm | 16 ppb | 160 ppt |
| 13 | Formaldehyde | 3.0 ppb | 14.7 ppt | 89 ppq |
| 14 | Toluene | 0-0.1 ppb | 450 ppt | 41 ppq |
| 15 | Butyric Acid | 0.1 ppb | 2.3 ppt | 2 ppq |
| 16 | Butyraldehyde | — | 130 ppb | 24 ppt |
| 17 | Propionic Acid | — | 79 ppb | 19 ppt |
| 18 | Pyruvic Acid | — | 110 ppb | 8 ppt |
| 19 | Dimethyl Sulfide | 13.8 ppb | 10 ppt | 0.5 ppq |
| 20 | Dimethyl Ether | — | 8.3 ppb | 10 ppq |

In the example, a detection method according to at least one embodiment is carried out using a spectroscopic system as described herein and the average sensitivity of the overall experiments was improved by a factor of 100 compared to other analysis methods. That improvement is attributable to the sensor device described herein.

The invention claimed is:

1. A sensing device for determining one or more properties of at least one sample, the sensing device comprising:
   (a) at least one device configured and operable to produce electromagnetic radiation of predetermined properties, said at least one device being configured as a layered structure and comprising: a light interacting layer, in communication with at least one light emitting source, comprising one or more light interacting regions, each configured to define a closed-loop light mixing path for optically coupling a pair of input coherent light components of predetermined first and second frequencies to create an output radiation component of a third beating frequency of a predetermined high-frequency profile; and a control layer interfacing said light interacting layer, said control layer being configured for controllable switching between an inoperative opaque state and an operative transparent state with respect to the at least one third beating frequency, to therefore selectively prevent and allow transmission of the at least one output radiation component of the third frequency towards a medium in the vicinity of the layered structure; and
   (b) at least one sampler coupled to an output of the at least one device to thereby receive said output electromagnetic radiation; wherein said sampler is configured as an electron emission device comprising at least one transmitter, at least one receiver and at least one sampling cell located therebetween, said at least one transmitter being configured as a photocathode configured and operable to receive the output electromagnetic radiation and generate corresponding photo electrons that travel through said at least one sampling cell towards said at least one receiver being configured as an anode, wherein interaction between the photo electrons and the at least one sample in said sampling cell is indicative of said one or more properties of said sample.

2. The sensing device according to claim 1, wherein at least one of the following is being held true (a) wherein said third beating frequency is in the THz range; (b) said light interacting layer has an elliptical shape; said elliptical shape varies the Fabry-Perot resonance thereof to thereby blue-shift said third beating frequency; (d) said control layer is controllable transparency with respect to at least one selected from a group consisting of a third beating frequency and input coherent light components of predetermined first and second frequencies; (e) said control layer, in said transparent state, is transparent to said third beating frequency to thereby permit the electromagnetic radiation to pass therethrough; (f) said control layer, in said opaque state, is opaque to said input coherent light components of said predetermined first and second frequencies to thereby permit the interaction thereof within said light interacting layer; (g) said light emitting source is adapted to provide coherent light; (h) said device further comprising a lighting layer interfacing the light interacting layer and comprising one or more coherent light emitters configured to produce one or more pairs of the input coherent light components of predetermined first and second frequencies; and any combination thereof.

3. The sensing device according to claim 2, wherein at least one of the following is being held true (a) said device for producing electromagnetic radiation of predetermined properties further comprises a focusing layer interfacing with the control layer and comprising a focusing device for controlling focusing properties of the electromagnetic radiation of the third frequency; (b) said at least one light emitting source is either integrated within said device or externally to said device; said at least one light source is a laser in the visible or infrared range; further wherein said light emitters sources are vertical-cavity surface-emitting lasers (VCSELs); wherein said VCSEL has high contrast grating (HCG) integrated therewith as a top mirror of the VCSEL; (c) said light interacting layer is a ring resonator; (d) said light interacting region has an elliptical shape; (e) said control layer comprises vanadium dioxide ($VO_2$) nanoparticles configured and operable to controllably switch between opaque and transparent phases upon being subjected to electrons directed to the control layer; (f) said control layer comprises a mesh of gold nanoparticles configured as a plasmonic photocathode such that when illuminated by a spectrally resonant femtosecond laser pulse said electrons are created; (g) said electromagnetic radiation has the third frequency in a terahertz range; and any combination thereof.

4. The sensing device according to claim 1, wherein said device for producing electromagnetic radiation of predetermined properties additionally comprises a phase modulator; wherein said phase modulator is interconnected with said light interacting layer and adapted to phase modulate said input coherent light components of predetermined first and second frequencies to cause interaction/interference therebetween and to create said output radiation component of a third beating frequency of said predetermined high-frequency profile; further wherein said phase modulator is a MEMS device.

5. The sensing device according to claim 1, wherein said light interacting layer is at least one selected from a group consisting of a fused nano fiber coupler, a coupler on chip silicon on insulator (SOI) assembly, an integrated phase modulator chip, a separated packaged-phase modulator chip and any combination thereof.

6. The sensing device according to claim 1, wherein at least one of the following is being held true:
a) volatile compounds are captured in said sampler affecting said interaction between the photo electrons and the at least one sample in the sampling cell; b) said sensing device additionally comprises at least one pressure source adapted to apply suction to said sample and to thereby capture volatile compounds in said sampler affecting said interaction between the photo electrons and the at least one sample in the sampling cell; c) said sensing device additionally comprises at least one membrane structured to ensure suction of volatile compounds in said sampler and to seal said volatile compounds in said sampler affecting said interaction between the photo electrons and the at least one sample in the sampling cell; d) said sensing device additionally comprises means adapted to release volatile compounds from said sampler after determination of said one or more properties of said sample; e) said sensing device additionally comprising means adapted to clean volatile compounds from said sampler after determination of said one or more properties of said sample; and any combination thereof.

7. The sensing device according to claim 1, additionally comprising (a) at least one controller programmed to receive data indicative of collected volatile compounds of the at least one sample in the sampling cell interacting with said third beating frequency of said predetermined high-frequency profile; and (b) processing said data to identify a signature of at least one compound indicative of said collected volatile compounds of said at least one sample.

8. The sensing device according to claim 1, wherein at least one of the following is being held true (a) said sample is in gas, liquid, solid or fluid phase; (b) said one or more properties of the sample comprise an identification of one or more constituents of the sample; (c) said one or more properties of the sample are determined based on a pre-built library of signatures stored in a database; (d) the sensing device is configured and operable for use in an IOT device, personal device, a smartphone, a tablet or a computer; (e) said sampler is configured to capture volatile compounds by applying suction to said sample, said volatile compounds or said sample being one selected from a group consisting of Dimethyl Ether, Isoprene, Methyl Nitrate, Methyl Cyanide, Chloromethane, Acetaldehyde, Acetone, HCN, Water, Ethanol, Methanol, Ethyl Benzene, CO, Formaldehyde, Butyraldehyde Toluene, Butyric Acid, Propionic Acid, Dimethyl and Sulfide Pyruvic Acid, Zolpidem, Ambien, Benzodiazepines, Valium, Librium, Xanax, Ativan, Rohypnol, Whitleys, Trip-and-Fall, Ruffies, Rophies, Rope, Roopies, Roofies, Roches, Roach-2, Roach, Mind Erasers, Rib, Lunch Money, R-2, Poor Man's Quaalude, Mexican Valium, LA Rochas, Forget Pill, Circles, 3,4-Methylenedioxymethamphetamine (MDMA) and any combination thereof; and any combination thereof.

9. A sensing method for determining one or more properties of at least one sample, comprising:
   (a) providing at least one device configured and operable to produce electromagnetic radiation of predetermined properties, said at least one device being configured as a layered structure and comprising: a light interacting layer, in communication with at least one light emitting source, comprising one or more light interacting regions, each configured to define a closed-loop light mixing path for optically coupling a pair of input coherent light components of predetermined first and second frequencies to create an output radiation component of a third beating frequency of a predetermined high-frequency profile; and a control layer interfacing said light interacting layer, said control layer being configured for controllable switching between an inoperative opaque state and an operative transparent state with respect to the at least one third beating frequency, to therefore selectively prevent and allow transmission of the at least one output radiation component of the third frequency towards a medium in the vicinity of the layered structure; and
   (b) coupling at least one sampler comprising (i) at least one transmitter, (ii) at least one receiver and (iii) at least one sampling cell located therebetween, to an output of said device to thereby receive said output electromagnetic radiation, wherein said at least one sampler is configured as an electron emission device, said at least one transmitter being configured as a photocathode configured and operable to receive the output electromagnetic radiation and generate corresponding photo electrons that travel through said at least one sampling cell towards said at least one receiver being configured as an anode, wherein interaction between the photo electrons and the at least one sample in said sampling cell is indicative of said one or more properties of said sample.

10. The sensing method according to claim 9, wherein at least one of the following is being held true; a) further comprising capturing volatile compounds of the sample in said sampling module sampler affecting the interaction between the photo electrons and the at least one sample in said sampling cell; b) additionally comprising applying suction on said sample and thereby capturing volatile compounds of the sample in said sampler affecting the interaction between the photo electrons and the at least one sample in said sampling cell; c) additionally comprising applying suction to volatile compounds of the sample and sealing said volatile compounds in said sampler by at least one membrane; d) additionally comprising releasing volatile compounds from said sampler after determination of said one or more properties of said sample; e) additionally comprising cleaning said volatile compounds from said sampler after determination of said one or more properties of said sample; and any combination thereof.

11. The sensing method according to claim 9, additionally comprising (a) receiving, by at least one controller, data indicative of collected volatile compounds of the sample interacting with said third beating frequency of said predetermined high-frequency profile; and (b) processing said data for identifying at least one signature indicative of said volatile compounds the sample.

12. The sensing method according to claim 9, wherein at least one of the following is being held true (a) said sample is in gas, liquid, solid or fluid phase; (b) said one or more properties of the sample comprises an identification of one or more constituents of the sample; (c) said one or more properties of the sample are determined based on a pre-built library of signatures stored in a database; and any combination thereof.

13. The sensing method according to claim 9, being configured and operable for use in any IOT device, personal device, a smartphone, a tablet or a computer.

14. The sensing method according to claim 9, comprising capturing, by said sampler, volatile compounds from the sample, said volatile compounds or said sample being one selected from a group consisting of Dimethyl Ether, Isoprene, Methyl Nitrate, Methyl Cyanide, Chloromethane, Acetaldehyde, Acetone, HCN, Water, Ethanol, Methanol, Ethyl Benzene, CO, Formaldehyde, Butyraldehyde Toluene, Butyric Acid, Propionic Acid, Dimethyl Sulfide and Pyruvic Acid, Zolpidem, Ambien, Benzodiazepines, Valium, Librium, Xanax, Ativan, Rohypnol, Whitleys, Trip-and-Fall, Ruffies, Rophies, Rope, Roopies, Roofies, Roches, Roach-2, Roach, Mind Erasers, Rib, Lunch Money, R-2, Poor Man's Quaalude, Mexican Valium, LA Rochas, Forget Pill, Circles, 3,4-Methylenedioxymethamphetamine (MDMA) and any combination thereof.

* * * * *